United States Patent [19]

Hayden et al.

[11] Patent Number: 5,293,613
[45] Date of Patent: Mar. 8, 1994

[54] RECOVERY CONTROL REGISTER

[75] Inventors: Clifford O. Hayden, Jamaica Plain, Mass.; Robert J. Hurban, Rye; Susan B. Stillman, Poughkeepsie, both of N.Y.

[73] Assignee: International Business Machines Corporation, Armonk, N.Y.

[21] Appl. No.: 751,461

[22] Filed: Aug. 29, 1991

[51] Int. Cl.$^5$ .............................................. G06F 15/00
[52] U.S. Cl. .................................... 395/575; 395/375; 371/12; 371/19
[58] Field of Search .................. 395/575, 375; 371/12, 371/19, 7, 16.5, 9.1

[56] References Cited

U.S. PATENT DOCUMENTS

| | | | |
|---|---|---|---|
| 4,044,337 | 8/1977 | Hicks et al. | 364/200 |
| 4,589,087 | 5/1986 | Auslander et al. | 364/768 |
| 4,703,481 | 10/1987 | Fremont | 371/12 |
| 4,901,233 | 2/1990 | Liptay | 364/200 |
| 4,912,707 | 3/1990 | Kogge et al. | 371/12 |

OTHER PUBLICATIONS

IBM TDB vol.27, No. 5, Oct. 1984, pp. 2757-2759, "Exception Handling . . . Machine" by W. Brantley et al.
IBM TDB vol. 27, No. 4A, Sep. 1984, pp. 2231-2232 "Checkpoint Register" by J. A. Wetzel.
IBM TDB vol. 26, No. 9, Feb. 1984, pp. 4840-4841, "Central Processor Retry" by E. J. Annunziata et al.
IBM TDB vol. 25, No. 11B, Apr. 1983, pp. 5960-5961, "Shared Cache In a Checkpoint Environment" by Weiss et al.

Primary Examiner—Vincent P. Canney
Attorney, Agent, or Firm—Lynn L. Augspurger; Richard M. Ludwin

[57] ABSTRACT

A Recovery Control Register is embodied as two multibit registers; a staged register and an immediate register. The immediate register contains the information which is read by the CP microcode and used during recovery. The staged register is a platform where a footprint can be assembled by the CP microcode before the retry checkpoint is changed. The CP microcode can operate on either register through the use of "SET", "AND" and "OR" functions. The choice of these operators as well as the decision to separate the registers into bit ranges provides the microcode with maximum flexibility when setting up new checkpoint values. When a recovery algorithm requires that the recovery footprint change immediately, microcode operates on the immediate register. If, however, the recovery footprint needs to be synchronized with the event which requires the change, for example a store being released, the microcode puts the appropriate footprint into the staged register and issues a release signal to the completion/interrupt logic within the CP. When the release is processed and broadcast as a Completion Report a variable number of cycles later, the checkpoint is advanced and the immediate register is updated in the same cycle, thereby allowing for a crisp transition from one recovery window to the next.

16 Claims, 14 Drawing Sheets

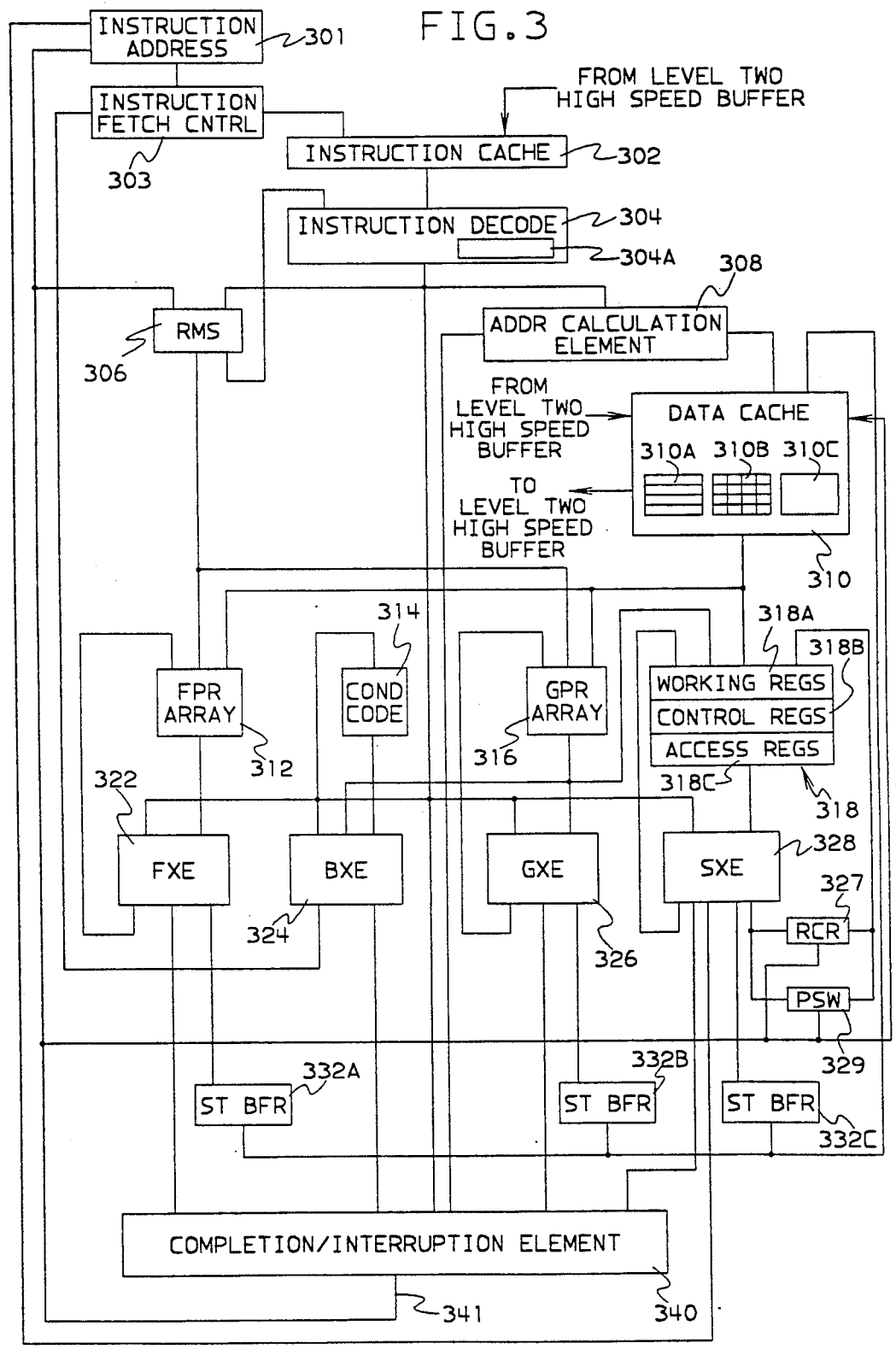

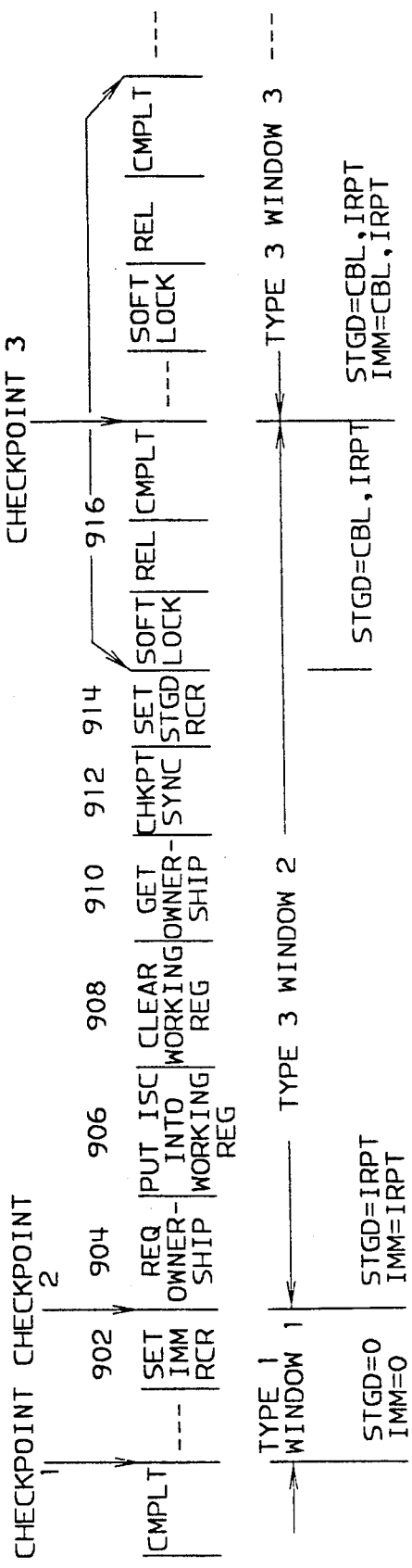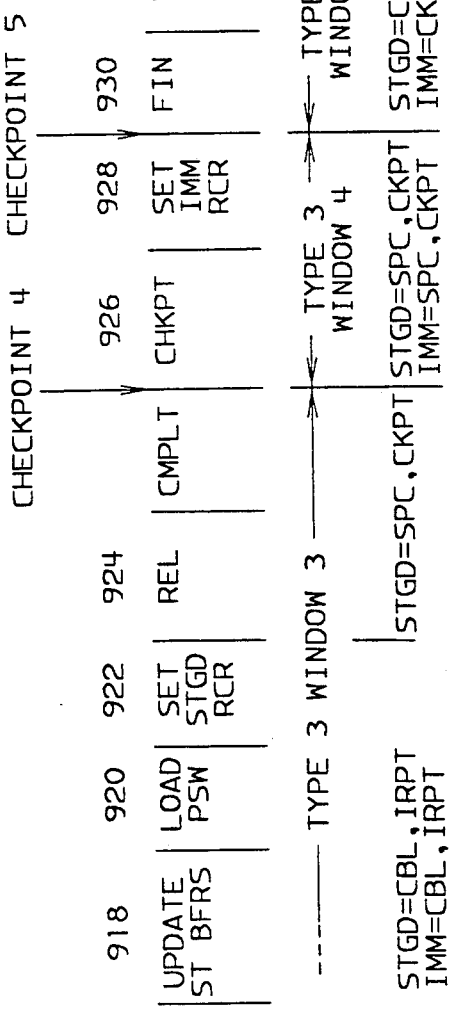
FIG. 9B

RECOVERY CONTROL REGISTER

BACKGROUND OF THE INVENTION

1. Field of the Invention

This invention relates to data processing systems having provision for error detection and recovery. More particularly, this invention relates to data processing systems which recover from errors by returning to and executing from a checkpoint in the instruction stream.

2. Related Art

The occurrence of random errors in data processing systems can have a substantial adverse effect on reliability and performance. A random or "soft" error is a deviation from the expected output or result which is not due to a continuing fault in the system. These random errors are generally characterized by non-reproducible fault syndromes caused by electrical noise or other randomly occurring sources. In contrast, "hard" errors are typically associated with electrical or mechanical component failures resulting in errors which are reproducible.

In early systems, random errors were handled by resetting the system and re-executing the affected program from the beginning. As programs became longer, this solution became unacceptable. Thus, in later systems, programs were segmented into parts such that errors could be handled by rerunning the program only from the beginning of the part in which the error occurred. As data processing systems and operating systems became more complex (due to, for example, multitasking) and time dependent, even this later approach became inadequate.

U.S. Pat. No. 4,901,233 to Liptay discloses a system which can execute instructions concurrently and out-of-sequence. A large number of instructions can be in some state of execution at any given time. While instructions can be executed out-of-sequence in such systems, the results of most instructions are not made visible to the rest of the system until the instruction is "architecturally completed". Completion of the instruction occurs when the execution of the instruction is finished, all exceptions associated with the instruction have been tested for and reported, and the instruction is the next one to logically complete (i.e. instructions complete in their logical program sequence). The challenges of recovering a Central Processor (CP) based on such a design from an error include the following:

1) determining which of the many instructions currently in process were affected by the error;

2) determining a known good state before the error occurred and and returning the CP to that state; and 3) modifying the state of the machine in a manner consistent with the logical program sequence while retrying the instructions.

FIG. 1 shows six hypothetical instructions in various states of execution. Each division on this chart represents a clock cycle or machine cycle. Execution of one machine instruction can take one to many machine cycles depending on what function is to be accomplished, availability of data and resources, and other factors. The instructions are numbered in the order in which they were programmed, i.e. Instruction 0 is followed by Instruction 1 which is followed by Instruction 2 etc. Instruction 0 begins execution in cycle 1 and completes in cycle 3. Instruction 1 begins in cycle 2 but does not finish execution until cycle 6. Although Instructions 2 and 3 finish before Instruction 1, they cannot complete until Instruction 1 completes in order for the program to execute in its logically programmed order.

U.S. Pat. No. 4,044,337 to Hicks et al. entitled "INSTRUCTION RETRY MECHANISM FOR A DATA PROCESSING SYSTEM" and assigned to the International Business Machines Corporation describes an error recovery mechanism that establishes a checkpoint at the beginning of the execution of a machine instruction. Since instructions are executed out-of-sequence in the system described in Liptay's patent, application of this technique to this system would require checkpointing up to the maximum number of instructions capable of being outstanding at one time and sorting out the order to reexecute the instructions. The amount of checkpoint information to accomplish this would be large and the probability that the checkpoint information itself was damaged by the error would therefore increase, lowering the overall ability of the processor to recover from the error.

A further complication is introduced by the potential of instructions executed out-of-sequence to be cancelled if a previous, yet unfinished instruction results in a change in the assumed instruction sequence. This could be due to a branch resolving differently than was expected or an instruction encountering an exception or an asynchronous interruption (for example an I/O, external, or repressible machine check interrupt or an operator request) becoming pending or enabled during some point in the processing. This would also have to be sorted out during the retry process to determine which checkpoints to save and which to discard.

Given that in Liptay's processor design some instructions may have already finished but not yet completed, another approach could be to save the results of the finished instructions and apply Hick's algorithm to only those instructions not yet finished.

In FIG. 1, if an error occurs in cycle 5, instruction 4 has begun, instruction 3 is just finishing and instruction 2 is finished although not yet complete. Since the error could have potentially affected one, some, all or none of the instructions in process, instructions 1, 3, and 4 need to be redone. Although instruction 2 has finished, trying to preserve its results has the following problems:

1) the logic to determine which instructions are finished and then sort out which need to be redone is prohibitively complex;

2) changes in the assumed instruction sequence would still have to be sorted out, discarding or saving checkpoints and finished results in this case instead of only checkpoints; and 3) any soft error in the logic which retains the finished status of an instruction would make the instruction unretrievable since this information would be required to retry successfully.

Additionally, some operations executed by processors designed to meet the specifications described in the Enterprise Systems Architecture/390 Principles of Operations (ESA/390 POP), require or are implemented such that results are made visible to and possibly cause a reaction in other system facilities as part of their execution and before they complete. For example, in some computer systems, communication between the I/O subsystem and the Central Processor is accomplished via interlocked updates to data areas in storage known as control blocks.

An interlocked update consists of first fetching a particular part of the control block called a lock byte using a hardware interlocked fetch. A hardware interlocked fetch, also called obtaining a hardlock, is a mechanism which insures that the requestor of such a fetch has exclusive rights to the data and no other requestors may store into or fetch that data until the interlock has been released. Once the hardlock is obtained, an identifying tag known as a softlock is placed into this byte, the lock byte is stored and the hardlock is released. Any other elements wanting to use the data covered by this softlock will see the tag in the lock byte and will not use the data until the lock byte is cleared. Both obtaining the softlock and releasing it require updating storage before the instruction has completed. Additionally, once the processor has control of the softlock, it will proceed to update other areas in the control blocks thereby initiating the desired I/O operation and changing the state of the I/O Subsystem. If an error occurs during one of these I/O instructions, storage has been altered and the effects potentially seen by other system elements. The altered storage location also may have caused a reaction in another processing element. Thus, simply backing up the processor to its state before or at the start of that operation will not nullify the effects of the execution even though the instruction did not complete. Special handling of these types of operations is therefore required when a soft error is encountered. It is desired however, that the number of special cases to be handled be minimized to reduce the number of algorithms to be developed, maintained and tested.

Two other examples of such operations which updated system facilities before they have completed are certain implementations of Page In and Page Out to Expanded Store. During execution of these instructions, a page of data is moved into or out of main storage, respectively. For some implementations, paging occurs before the instruction completes. The data which is moved can thus be seen by processing elements other than the Central Processor which executed the instruction. If an error occurs while this instruction is executing, the results cannot be undone by backing up the processor to its state before the execution of this instruction.

As an additional aid in error recovery, it is known in the art to provide a computer system with a checkpoint register. Such a facility is described in an article entitled "CHECKPOINT REGISTER" (IBM Technical Disclosure Bulletin, Vol. 27, NO. 4A, September 1984, pp 2231-2232). The checkpoint register, located in the instruction element of a central processor, can be set to any value by the Central Processor microcode via an emit field. The checkpoint register is reset at the beginning (successful first cycle) of each instruction. The register can be tested by CP microcode for retry and detailed error reporting.

When an error in the CP occurs, the CP clocks are stopped. A maintenance and support service facility (MSSF) then scans the registers and triggers in the CP including the checkpoint register. The MSSF tests an error trigger which denotes checkpoint register parity error. If this trigger is on, the MSSF considers the error unretriable, a system damage (SD) indication is set, and the CP is set to the checkstop state. The MSSF then checks the Checkpoint register. A value of 64 through 255 indicates system damage. The MSSF then tests the non-retriable triggers in the CP. If retriable, the system damage will only be reported when the retry threshold is reached and a machine check interrupt is taken.

The value contained in the Checkpoint register tells the MSSF what type of operation was in progress in the CP when the error occurred, as well as whether or not special action is required by the MSSF to return the CP to a logically consistent state, or that the CP cannot be brought back to a consistent state except by a system reset (i.e. a "System Damage" condition exists).

In summary, the Checkpoint Register is a means of communicating to the MSSF the internal state of the CP for purposes of error recovery (checkpoint retry), and error reporting to the program (machine check interruption).

While the above described "prior art" Checkpoint Register provides many advantages in terms of error recovery, it does not provide for crisp transitions synchronized with the completion of checkpoints. In the above described register, data that is entered into the register is immediately available to the MSSF. In systems such as described in U.S. Pat. No. 4,901,233 to Liptay however, where checkpoint transitions are marked by instruction completion, the data presently in the register may be incorrect or premature. Thus, a mechanism is needed to ensure that the data provided to the MSSF is neither obsolete nor premature.

DOCUMENTS INCORPORATED BY REFERENCE

U.S. Pat. No. 4,901,233 to Liptay, U.S. Pat. No. 4,044,337 to Hicks et al. and *IBM Enterprise Systems Architecture/390—PRINCIPLES OF OPERATION* (document SA22-7201-00; available from the IBM Corporation, Armonk N.Y.) are each incorporated by reference, in their entireties, as if reproduced in full below.

SUMMARY OF THE INVENTION

In light of the above, the present invention provides a recovery control register which maintains instruction processing footprints and includes means for providing correct and timely error recovery information to an error recovery handling facility synchronously with the checkpoint completion.

In the preferred embodiment the Recovery Control Register is embodied as two multi-bit registers; a staged register and an immediate register. Both of these registers are of the type that if new data is not ingated or they are explicitly reset, they retain their previous value. The immediate register contains the information which is read by the CP microcode and used during recovery. The staged register is a platform where a footprint (indicative of the current operation in progress and the state of various system facilities during instruction execution) can be assembled by the CP microcode before the retry checkpoint is changed. The CP microcode can operate on either register through the use of "SET", "AND" and "OR" functions. The choice of these operators as well as the decision to separate the registers into bit ranges provides the microcode with maximum flexibility when setting up new checkpoint values.

When a recovery algorithm requires that the recovery footprint change immediately, microcode operates on the immediate register. If, however, the recovery footprint needs to be synchronized with the event which requires the change, for example a store being released, the microcode puts the appropriate footprint into the staged register and issues a release signal to the completion/interrupt logic within the CP. When the release is processed and broadcast as a Completion Report a variable number of cycles later, the checkpoint is advanced and the immediate register is updated in the same cycle, thereby allowing for a crisp transition from one recovery window to the next.

BRIEF DESCRIPTION OF THE DRAWINGS

FIG. 3 is a functional diagram of an exemplary Central Processor (CP) within the CEC of FIG. 2.

FIG. 9B is a timing diagram showing the different phases of execution (recovery windows) of I/O interrupt and the required recovery actions for failures occurring in each of the phases.

DETAILED DESCRIPTION

Figure 1:
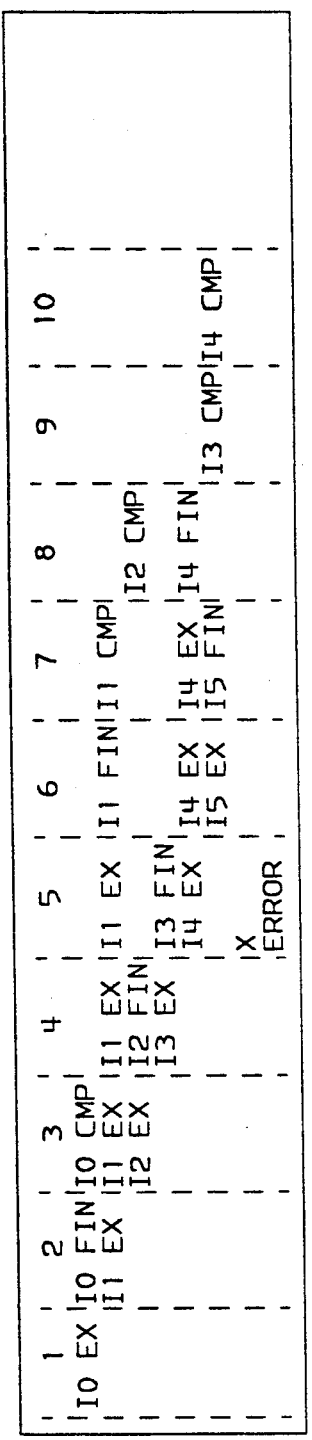
FIG. 1 is a diagram showing states of execution of various instructions in a processor that can execute instructions out-of-sequence.
Figure 2:
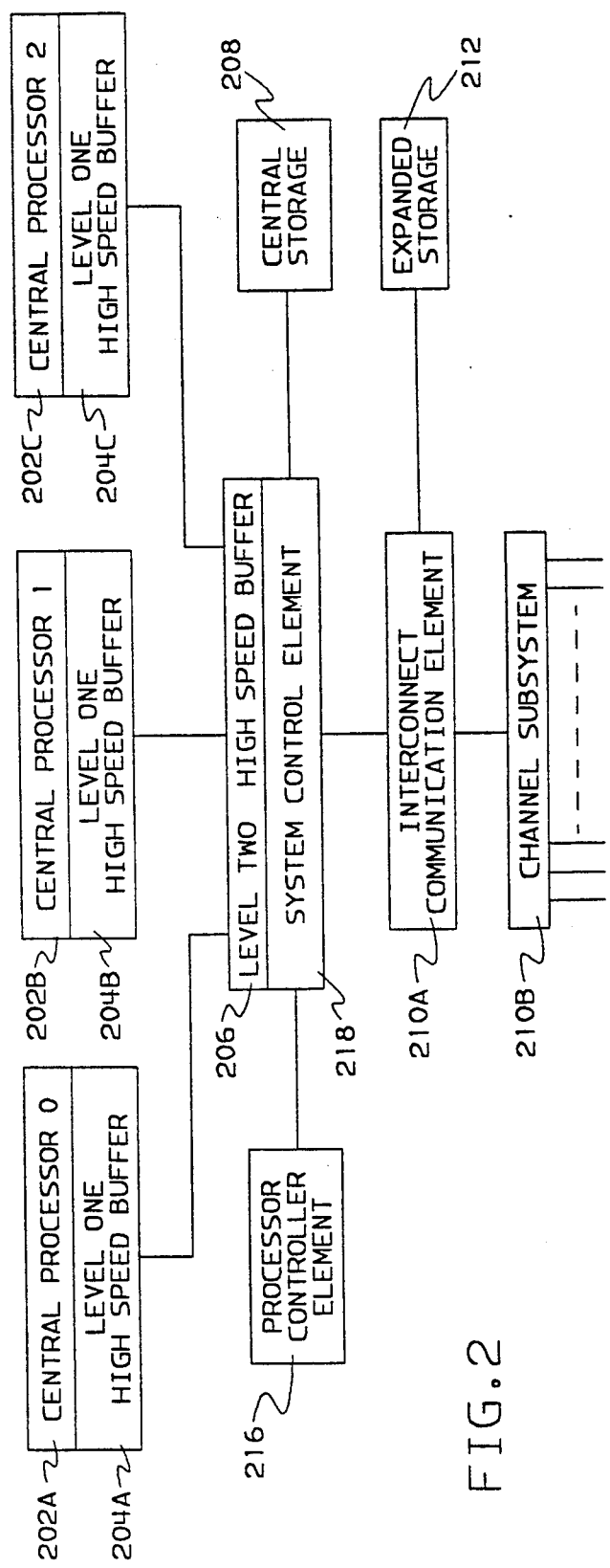
FIG. 2 is a block diagram of a Central Electronic Complex (CEC)

The invention will now be described with reference to FIGS. 2 and 3. FIG. 2 is a block diagram of a Central Electronic Complex (CEC) including three Central Processors 202a–c. Each Central Processor (CP) has its own conventional first level high speed buffer (L1) 204a–c. The L1s are connected in turn to a second level high speed buffer (L2) 206 which is shared by all the CPs. The L2 206 is connected to Central Storage 208, also known as main storage, through a System Control Element (SCE) 218. The general term 'storage' is used to refer to data existing in either level high speed buffer (204a–c or 206) or the Central Storage 208 itself.

The CEC of FIG. 2 also includes an Interconnect Communication Element (ICE) 210a which controls data transfer and communication between the SCE 218, an Expanded Storage (ES) 212 and a Channel Subsystem 210b. The ICE 210a and Channel Subsystem 210b are also collectively referred to as the I/O Subsystem. System operations and support functions such as powering on and off and configuring the system are controlled by a support processor called the Processor Controller Element (PCE) 216. The PCE is also used to assist system elements in recovering from errors. Machine-Check error handling, checkpoint synchronization and the general operation of systems conforming to ESA/390 architecture are further described the ESA/390 Principles of Operation.

FIG. 3 is a functional diagram of an exemplary Central Processor within the CEC of FIG. 2. As is conventional, each CP's first level high speed buffer (L1) is of the split-cache type including an instruction cache 302 and a data cache 310. Instructions from the instruction cache 302 are fetched by the Instruction Fetch Control Logic (I-FETCH) 303 and fed to the Instruction Decode Logic 304. The Instruction Decode Logic 304 determines what type of instruction is to be executed and what type of data is required for its execution (General Purpose Registers, Floating Point Registers, Data from Storage, other) and forwards the instruction to the appropriate execution element (Floating Point Execution Element 322, Branch Execution Element 324, General Execution Element 326, or System Execution Element 328) and support logic (Register Management System 306, Address Calculation Element 308 and Completion/Interruption Element 340). The Instruction decode logic includes control logic 304A which enables the CP to block or suspend (and unblock/recommence) decoding of all or specified types of instructions (for example, when an instruction must be executed with overlap disabled or to prevent decoding of a serializing instruction while an earlier serializing instruction is being executed).

The Register Management System 306 controls the assignment of physical registers (Floating Point Register Array 312 and General Purpose Register Array 316) to corresponding logical registers referenced by instructions. The structure and operation of the Register Management System is described in more detail in U.S. Pat. No. 4,901,233. The Address Calculation Element (ACE) 308 calculates operand addresses.

The CP of FIG. 3 includes a number of specialized execution elements which receive instructions and data from the Instruction Decode Logic 304 and Data Cache 310, respectively. As in prior art systems, a conventional branch history table (BHT) associated with the I-FETCH logic 303 predicts which direction a branch will take. Responsive to such a branch prediction, subsequent instructions are fetched in the predicted direction and conditionally executed. The Branch Execution Element (BXE) 324 is dedicated to determining the way a branch will actually resolve and whether the prediction was correct. The Floating Point Execution Element (FXE) 322 is connected to the physical Floating Point Register Array 312 and is dedicated to processing floating point instructions. The General Execution Element (GXE) 326 is connected to the physical General Purpose Register Array 316. The GXE executes simple instructions which change or use general purpose registers (GPRs) and some of the simple store instructions such as MOVE IMMEDIATE.

The System Execution Element (SXE) is a microcode driven execution element. The SXE microcode implements all "type 3" instructions (described in more detail later) and includes the CP recovery microcode. The System Execution Element 328 is connected to a set of registers 318; the working registers 318A, the Control Registers 318B, and the Access Registers 318C. The SXE's Working Registers are temporary storage positions for intermediate results, data from storage, and system data that needs to be kept easily accessible. The SXE 328 is also connected to bits 0 to 31 of the Program Status Word (PSW) 329. Bits 32 through 63 are handled differently and are referred to as the Instruction Address 301. The SXE 328 executes Storage to Storage type logical and decimal instructions and system control functions such as LOAD PSW and START INTERPRETIVE EXECUTION.

The Recovery Control Register 327 is also controlled by the SXE 328. The Recovery Control Register (RCR) 327 provides a mechanism for maintaining recovery footprints which are assembled during execution and used when recovering from a system error. The CP recovery microcode loads, sets and reads the Recovery Control Register 327 and performs the CP error recovery procedures.

Each execution element except for the Branch Execution Element 324 has an associated set of store buffers 332a–c. These buffers hold execution results destined for storage until the instruction which executed the store is completed and the data can be moved into the high speed buffers 310 and 206 in FIG. 2. Each of the ACE 308, the FXE 322, the BXE 324, the GXE 326 and the SXE 328 also have associated input instruction queues (not shown).

The Data Cache (D-Cache) 310 includes a store queue 310A, a D-Cache memory array 310B and checkpoint controls 310C. The store queue 310A contains the address and control information for the operand stores buffered in the store buffers 332A–C. The data cache memory array 310B is a conventional random access cache memory array. The data cache checkpoint controls 310C determine when checkpoint synchronization has completed. The Data Cache 310 is connected to the Level Two High Speed Buffer 206 of the CEC of FIG. 2.

The Completion/Interruption Element 340 controls instruction completion and interrupt handling by completing instructions in logical order when their executions have finished and recognizing any program exceptions which may have been encountered during execution or asynchronous interrupts which may be pending. As a result of an instruction completing, the Condition Code 314 may be updated. This in turn is used by the Branch Execution Element 324 to resolve predicted branches.

The Instruction Address 301 is the address of the next instruction to complete which is equivalent to the instruction address as a result of the last instruction to complete. It is updated by the SXE 328, the Completion Reports 341 generated by the Completion/Interrupt Logic 340, and branch target addresses.

The Address Calculation Element (ACE) 308 calculates operand addresses, generates operand fetch and store requests and sends these to the D-cache 310, which processes them in the order specified by the instruction stream. When an operand store request is made, an entry is placed in the store queue 310A which contains various address and control information about that operand store. When an instruction which includes an operand store is processed, an execution unit (FXE 322, GXE 326, or SXE 328) generates the store result and places the result in the corresponding store buffer 332(A–C).

The Central Processor of FIG. 3 is of a type that allows concurrent, out-of-order execution of instructions by several different processing elements. While instructions can be executed out-of-sequence, the results of most instructions are not made visible to other system elements beyond the CP until the instruction is "architecturally completed" by the Completion/Interruption Element 340. Completion of the instruction occurs when the execution of the instruction is finished, all exceptions associated with the instruction have been tested for and the instruction is the next one to logically complete (i.e. instructions complete in their logical program sequence even though they may have been executed out-of-sequence).

As the result of the "Completion Report" 341 which is generated by the Completion/Interruption Element 340 to signal the completion of an instruction, the D-cache 310 marks all entries in the store queue 310A for that instruction as having been completed. Subsequently the D-cache 310 takes the store results from the store buffers 332(A–C) and writes these into the D-cache array 310B. The store results are also forwarded at this time to the Level Two High Speed Buffer (L2) 206 to be stored there. The L2 206 provides an indication to the D-cache 310 of when the stores sent to it have been "done". For the purposes of the present invention, stores are considered "done" when they have reached a point in the L2 206 beyond which errors are extremely unlikely or can no longer be associated with a specific operand store. Any errors in the processing of an operand store before the point at which the store is considered "done" will be isolated to the current checkpoint interval. Any errors beyond that point in the processing of a store will not be so isolated.

Upon receipt of the completion report from the completion/interruption element 340 the Register Management System 306 updates its pointers to show that the GPR and FPR values changed by this instruction are now the architected values, the Condition Code 314 is updated and the Instruction Address 301 is incremented or changed.

The store buffers 332a–c and the Register Management System 306 enable the processor to not only fetch, but execute past a number of unresolved branches. This mechanism is described in detail in U.S. Pat. No. 4,901,233. If a branch is predicted incorrectly, all instructions logically after the branch, even though they may have finished, can be nullified, since their results are buffered and not yet visible to the rest of the system. Program exceptions act in the same manner; when an instruction with a program exception completes, all instructions logically after it are made to disappear. Asynchronous interrupts for which the processor is enabled are handled when an instruction completes. Here again, instructions logically after that point are nullified and processing is diverted to another instruction stream.

The ultimate goal is therefore to be able to handle a soft error in the same manner as an incorrectly predicted branch or an interrupt and return the CP to a state equivalent to that as a result of the last instruction complete. When an error occurs, no further instructions are allowed to complete thus preserving the checkpoint and in general, instructions beyond that point are discarded, thus removing the concerns for maintaining numerous checkpoints and/or intermediate or final results and sorting out which of the instructions should be reexecuted and in what order.

This approach allows for the generic recovery algorithm to be straightforward and simple. The processor is returned to the state it was in as a result of the last instruction to complete. This is a consistent state and an architecturally interruptible point. At this point, the processor can begin fetching from the address in the instruction address without regard to what that instruction is. Additionally, any interrupts for which the CP is enabled which were pending or may have become pending during the recovery process, can also be handled at this point. The effect of the entire recovery process is to return the CP to a consistent checkpoint. The execution of instructions and the handling of interrupts then resumes as normal.

For some operations which modify the state of the system beyond the bounds of the CP or for which the hardware is not covered by a register management like mechanism, it is not possible to undo the effects of execution using the same technique as recovering from an incorrectly predicted branch or an interrupt. Therefore, some special hardware, checkpointing techniques, and handling during error recovery allow the CP to either be returned to the state equivalent to the last instruction to complete or advance the checkpoint past the failing operation to a state as a result of its completion.

The preferred embodiment of the present invention involves the classification of all operations which the central processor performs are categorized into one of three recovery types. The terms operation and instruction are used interchangeably and refer to both instructions specified in the ESA/390 POP as well as machine dependent implementations of program and asynchronous interrupts, operator functions and other units of work performed by the CP. The determination of category is made based on the architected and machine dependent facilities the operations manipulate and how these facilities are manipulated. The classification of operations into types allows for recovery to be generalized into three broad algorithms instead of handling each instruction independently.

The system facilities which determine into which category an operation is classified include both the architected and machine dependent constructs which together define the state of the system. The architected facilities refer to data structures which are defined in the ESA/390 POP. Included in this category are the General Purpose Registers, the Floating Point Registers, the Access Registers, the Control Registers, the PSW and instruction address, storage, subchannels, the time of day clock, pending interrupts, etc. The machine dependent facilities are structures required by the implementation of the system to define states of the architecture or operating modes not specifically identified by unique constructs in the POP. Examples of machine dependent facilities can include an indicator that the CP is executing in interpretive execution mode, what features are on-line, and the locations of control blocks in storage.

Type 1 operations only modify storage, General Purpose Registers, Floating Point Registers, Access Registers, the Condition Code, and other processor facilities provided with "register-management-like" control. These changes are visible only when the operation completes. These operations are generally executed concurrently with one another and out-of-sequence and therefore are required to be able to disappear due to an earlier incorrect branch prediction or interruption. Before these operations complete, no effects of their execution can be seen by any other system element. If a soft error occurs while one or more of these operations are being executed or awaiting completion, the recovery checkpoint to be used is equivalent to the state the CP was in as a result of the last instruction complete, which is also equivalent to the state the CP would have to be returned to before handling an interrupt taken after the last instruction that completed. Recovery of Type 1 instructions involves returning the processor to the state it was in as a result of the last instruction to complete, initiating instruction fetching and handling of interrupts. Examples of Type 1 instructions are all instructions executed by the GXE 326 and the FXE 322 as well as Move Character, Move Character Long, and Compare and Swap.

Type 2 operations change facilities other than those listed for Type 1 operations. These are usually control facilities such as the PSW, Control Registers and the interpretive execution indicator. Backup facilities which hold the values these facilities had at the time of the last instruction complete are maintained. Type 2 operations are executed one at a time and in same order as logically programmed, so functionally they are not required to recover from incorrectly predicted branches and logically earlier interrupts. These types of instructions can also recover from soft errors by returning the processor to the state it was in as a result of the last instruction to complete since no other system element has seen any results of their execution. For Type 2 instructions, this involves not only backing up the Register Management System 306, purging non-completed stores from the store buffers 332a-c, etc. but also taking backup or checkpoint data from the backup facilities and placing it in the active facilities. Note that more elaborate checkpointing mechanisms can be built for facilities modified by Type 2 operations such as register management schemes. Since these mechanisms are not used for normal, error-free operation, the amount of hardware and complexity is usually not justified.

Figure 4A:
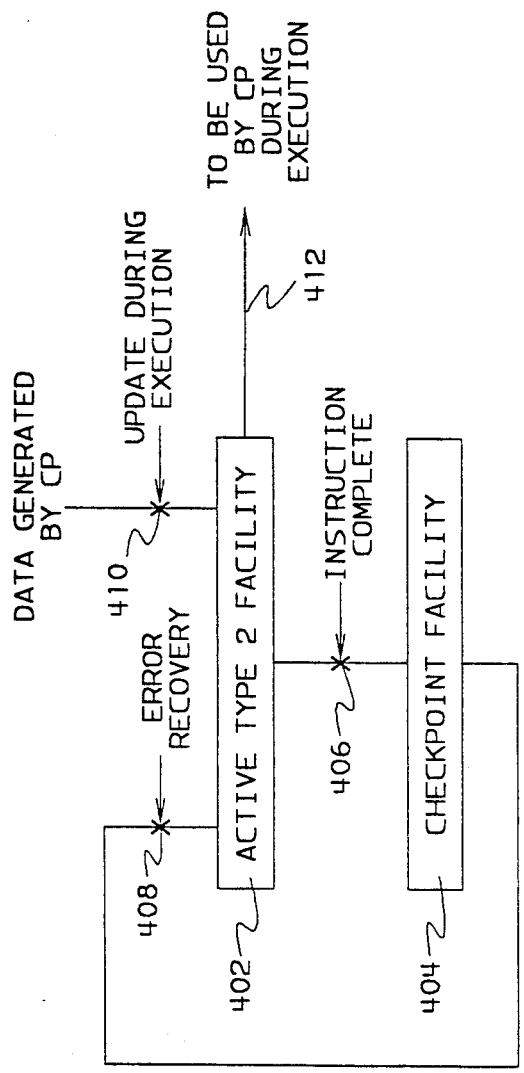
FIG. 4 is a block diagram of a generic Type 2 processor facility showing both its active copy and checkpoint copy and how checkpoint data is established and restored.
FIG. 4B is a timing diagram showing how the active and checkpoint registers change values with respect to execution of a Type 2 instruction.

FIG. 4A shows a typical facility that might be manipulated by a Type 2 operation. It is implemented as a register 402 and its backup or checkpoint register 404. The active register 402 is updated during execution by receiving data from an element of the CP 202 (for example the SXE 328 or ACE 308) on input 410. The value of the active register is also used by the CP when executing instructions and is retrieved by the CP using output 412. Functionally, only the active register is required for normal error-free operation. As a result of an instruction being completed, the value in the active register is placed in the backup register 404 via input 406. When recovering from a soft error, the value in the backup register can be moved into the active register by way of input 408. This can be implemented by either providing a direct path for the checkpoint value to be returned to the active register (shown as path 408 in FIG. 4A) or the checkpoint value can be loaded into the active register by manipulating an execution unit's dataflow. It should be understood that any number of such type two facilities can be provided within the various processing elements of the CP. For example, one or more of such facilities can be provided to backup or checkpoint operations within the SXE 328 while others of such facilities can be provided in the ACE 308.

Figure 4B:
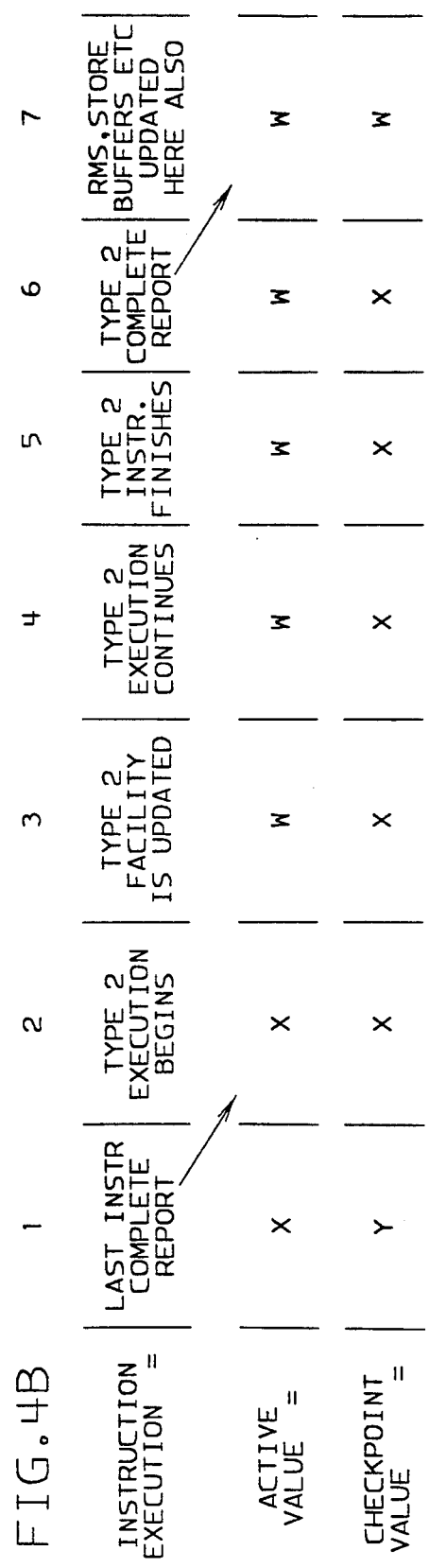

FIG. 4B shows a sample execution of a generic Type 2 operation. In cycle 1, a Completion Report is generated by the Completion/Interruption Logic 340. This causes the value in the checkpoint register 404 to be set equal to the value X in active register 402. In cycle 2, the Type 2 instruction begins execution. At this point both the active register 402 and checkpoint register 404 have the value X of the facility as a result of the last instruction to complete. The active facility 402 is updated in cycle 3 (to value W). Note that the checkpoint register 404 still maintains the value X as a result of last instruction to complete. In cycle 6 a Completion Report is generated for the Type 2 instruction. In cycle 7, the checkpoint register takes the value (W) of the active register. In addition any Type 1 facilities that were updated by this instruction are also updated with this Completion Report during cycle 7, thus the checkpoint is consistent. Examples of Type 2 operations are Load Control, Load PSW and Set System Mask.

Type 3 operations are distinct from Types 1 and 2 in that:

a. the way they manipulate system facilities allows some or all of the results to be seen by other system elements before the instruction has completed, or b. the type of facility manipulated is of a nature such that restoring the facility to the value it had before the instruction began will not yield the correct results and the update cannot be synchronized with instruction completion either due to architectural or implementation constraints.

In general, Type 3 operations have a "point of no return". That is, up until the time they let their results be seen by other elements or they update the critical facility they can be made to disappear using the same backup procedures used to nullify Type 1 and Type 2 operations. After that point, they cannot be made to disappear and they must be recovered using a special algorithm.

A few examples of Type 3 operations illustrate this point. Page In and Page Out are Type 3 operations. The implementation of the Page In and Page Out instructions in the system of FIG. 2 calls for the Central Processor 202a-c to request Expanded Store 212 to move a 4k page of data into or out of Central Storage 208. Because the Page In and Page Out instructions are defined architecturally to be synchronous, this data movement must be visible at the completion of the operation and since the Expanded Store - Central Store data transfer path of FIG. 2 is not equipped with store buffer equivalent facilities, the transfer occurs before the completion of the instruction in the Central Processor. Therefore, the data which is moved can be seen by elements other than the Central Processor which is executing the paging instruction. If an error occurs while this instruction is executing, the results of the data movement cannot be made to disappear because Central Storage or Expanded Storage have already been modified.

Other examples of Type 3 operations are ESA/390 I/O instructions and interrupts. As discussed earlier, communication between the Central Processors 202a-b and the I/O Subsystem 210a-b in FIG. 2 can be accomplished using interlocked updates to data areas called control blocks in storage. With this implementation, any other element seeing the identifying tag in the lock byte in storage will either not use the data in storage and wait for owner of the lock to release it, or assume that the owner is handling the request as in the case of an interrupt and reset its local initiative to take the interrupt. Once the processor has placed its softlock in the control block, it will begin modifying the contents of the control block, thereby modifying the architected state of the I/O subsystem. Therefore, even though the store buffers protect the checkpoint established at the last instruction complete for Type 1 and Type 2 instructions, the manner in which they are used by Type 3 operations cause that checkpoint to become inconsistent with respect to the last instruction to complete. If an error occurs at any point after the locking process has been initiated, returning the CP to the state as a result of the last instruction to complete will not undo the changes to the system.

A brief example of an instruction which cannot be undone by restoring its changed facilities to the value as a result of the last instruction complete not because other elements have seen the changes but because restoring the old value would result in incorrect results is the SET CLOCK instruction. Since time continues to pass, saving the value of the clock at the start of the instruction and restoring it during recovery would cause the clock value to fall behind, unless other provisions were made.

Recovery algorithms for Type 3 instructions usually have one of three flavors. The first flavor involves cleaning up changes made by the operation. As long as the architected state of the CEC has not been altered, changes made by an instruction can be made to disappear. An example of this is found in I/O recovery. If the only change the instruction made to storage was to place a soft lock in a control block, no architected facilities were changed and the recovery algorithm can unlock this control block and return the system to the state it was in had the I/O operation never started.

The second flavor of type 3 operation involves establishing intermediate checkpoints and keeping footprints of how far in the execution of the operation the processor has gotten before the error occurred. The state of the CP is then returned to the last intermediate checkpoint and the operation is finished and completed under recovery control. After this step has been completed, the CP is once again in a consistent architected state as a result of an instruction complete and execution can resume as described earlier.

The final flavor of Type 3 recovery re-executes the entire instruction again under recovery control. Information is maintained to force these operations to be retried without refetching them. Operations which can take advantage of this type of recovery can do so because the architecture allows for multiple storage accesses (as is the case with paging instructions) or because no other system element can see the changes which were made (as is the case with SET CLOCK).

All system state facilities require a mechanism for returning to the checkpoint or must be handled specially with a Type 3 algorithm. In addition to "register-management-like" schemes, store-buffer-like mechanisms and checkpoint registers, other techniques of providing checkpoint values for system facilities also exist. One example is the checkpoint facility developed for asynchronous interrupts for the CP in FIG. 2. Local copies of initiative for asynchronous interrupts are kept in the CP. They provide an easily accessible indication of pending asynchronous interrupts. The master copy of the interrupt initiative however is defined to be a control block in storage. When interrupts are made pending or are handled, indicators are placed in the control blocks as well as the local copies being updated. This allows the CP to use the synchronizing capabilities of the store buffers to checkpoint interrupt initiative. When as error occurs, the CP can restore its local copies based on the information in storage.

In the CP of FIG. 3, a retry checkpoint is established when the completion/interrupt controls 340 determine and signal that an instruction is complete via a completion report 341. This signal releases stores, updates the Register Management System 306 (essentially updating the GPRs and FPRs), buffers the PSW and other processor facilities all in one cycle. Therefore, in one machine cycle, the CP changes from "before an instruction is complete" to "after the instruction has completed". For Type 1 and 2 instructions, this occurs once at the end of instruction processing and if a hardware failure occurs before instruction completion, the CP is returned to the state it was in as a result of the last instruction completed and resumes operation from this point in the instruction stream. Type 3 operations however, typically establish several retry checkpoints during execution. In order to do this, the processor can take advantage of the Type 1 and 2 checkpointing hardware and establish intermediate checkpoints during execution of Type 3 operations.

Intermediate checkpoints are established in a similar fashion as checkpoints established by instruction completion. A release signal or a modified finish report is sent to the completion/interrupt controls 340. This modified finish report is processed by the completion/interrupt controls using the same rules as a true or "final" finish report which generates final completion reports (execution steps completed, all interrupts tested for, instruction is next to complete) and a modified or intermediate completion report is issued. This intermediate completion report causes an intermediate checkpoint to be established by updating the register management system 306 and releasing the store buffers 332A-C.

Note however, that not all facilities are advanced by an intermediate completion report since the Type 3 instruction is still in process. For example, it would not be correct to change the instruction address at an intermediate point. This mechanism enables the Type 3 instructions to be broken into several precise checkpoints or recovery windows. The point at which these checkpoints are required to be established is dependent on when the state of the system changes such that a different recovery algorithm is required. Not all checkpoints need to be synchronized with a completion report, however. The SET CLOCK instruction exemplifies this since (in the CP of FIG. 3) the update of the clock is not tied to the completion report.

It should be understood that there are other, alternative ways to implement the set clock function that would result in a simpler recovery. For example, one way to handle the SET CLOCK instruction would be to provide two clocks; one to be modified by the current instruction and another to provide a backup copy. Another alternative would be to build the clock such that updates are executed on one cycle and synchronized with the completion report.

Since special and unique clean up or processing is required for Type 3 operations, the CP requires a way to remember that it is executing a Type 3 operation so that if an error does occur, it can determine if special processing is required and what that special processing is. Also, these recovery footprints must be synchronized with establishing the retry checkpoints of facilities checkpointed by the completion report so that the appropriate recovery action is specified as the processor moves from one checkpoint to another. Additionally, the assumption that the actions of earlier checkpoints have taken place successfully can be used as a basis for the recovery algorithms.

Figure 5:
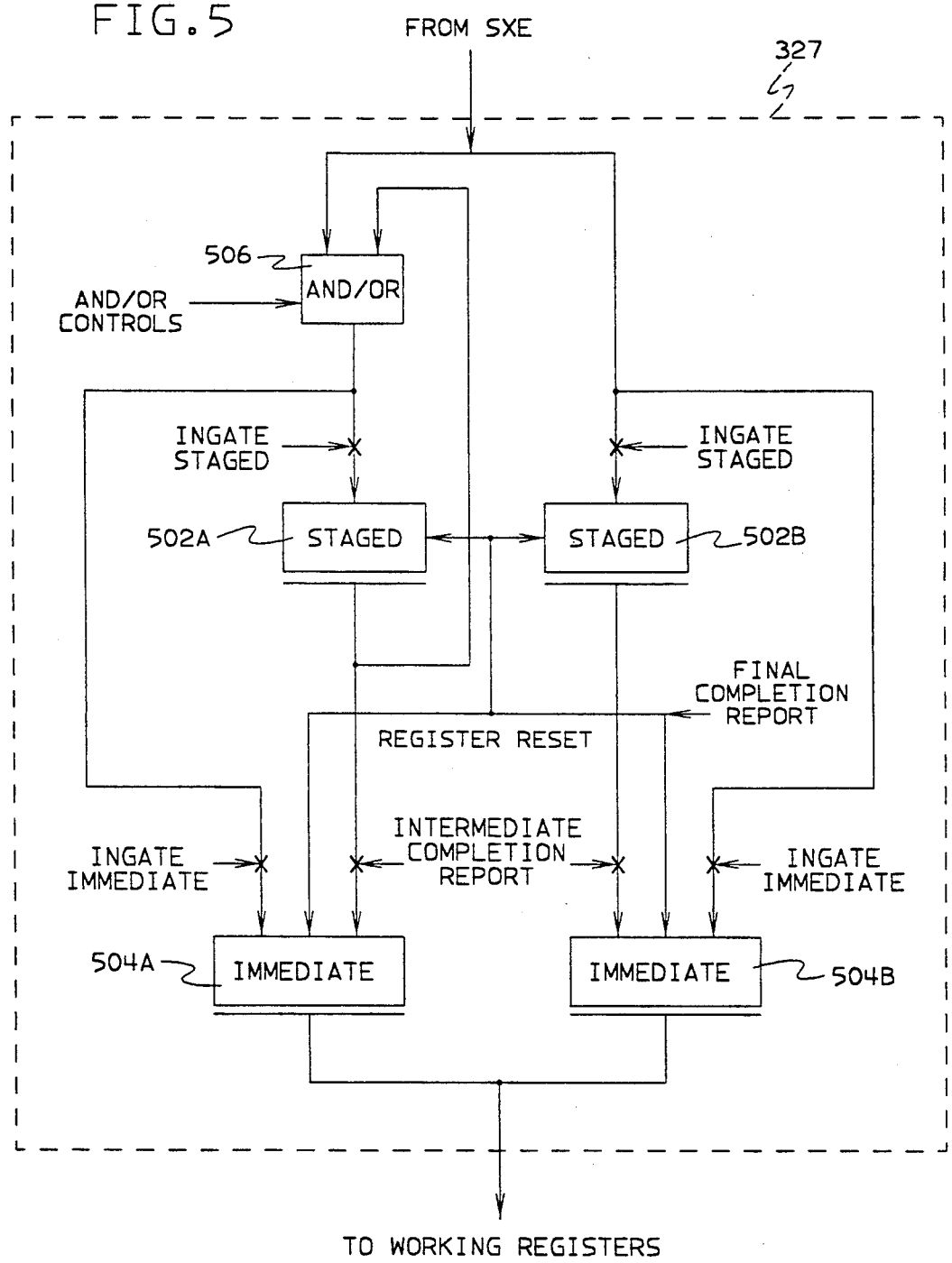
FIG. 5 is a block diagram of the Recovery Control Register (RCR) of FIG. 3.

A central component in controlling recovery and maintaining footprints is the Recovery Control Register 327 (illustrated in more detail in FIG. 5). The Recovery Control Register 327 is embodied as two multi-bit registers; the staged register 502$a$-$b$ and the immediate register 504$a$-$b$. Both of these registers are of the type that if new data is not ingated or they are explicitly reset, they retain their previous value. The immediate register 504$a$-$b$ contains the information used during recovery. The staged register 502$a$-$b$ is a platform where a footprint can be assembled before the retry checkpoint is changed. In this embodiment, CP microcode executes all Type 3 operations and therefore sets up the recovery footprints for these operations. Microcode can operate on either register through the use of "SET", "AND" and "OR" functions 506. The choice of these operators as well as the decision to separate the registers as shown was made to provide microcode with maximum flexibility when setting up new checkpoint values.

When the Type 3 algorithm requires that the recovery footprint change immediately, microcode operates on the immediate register. Since setting the clock is directly under microcode control and not synchronized with completion, microcode sets the immediate RCR and the clock simultaneously. If, however, the recovery footprint needs to be synchronized with the event which requires the change, for example a store being released, the microcode will put the appropriate footprint into the staged register 504$a$-$b$ and issue the release signal to the completion/interrupt logic 341. When the release is processed and broadcast as a Completion Report a variable number of cycles later, the checkpoint is advanced and the immediate register 504$a$-$b$ is updated in the same cycle, thereby allowing for a crisp transition from one recovery window to the next. Both registers are reset on the final instruction complete resulting from the final finish report. The Type 3 operation is complete and the footprints no longer apply.

Should a hardware failure occur in the processor, the completion of the current recovery window is blocked since the data manipulated in that window may have been contaminated by the error. In addition, the update of the immediate register 504$a$-$b$ is also blocked so that it contains the recovery footprint which is consistent with the last retry checkpoint which was actually completed.

For all soft errors, the PCE 216 is alerted to the error condition and sequences the recovery actions in the CP 202$a$-$c$ in this implementation. First a reset is initiated by the PCE 216. Then a microcode cleanup algorithm is executed. Through a combination of the reset and cleanup algorithm, the dataflow is reset and uncompleted checkpoint data is thrown away including uncompleted stores and register updates. CP microcode then examines CP error indicators to see if any checkpoint facilities including the RCR was corrupted by the error. If the RCR was corrupted by the error, the processor is placed in a checkstop state. If other checkpoint facilities are damaged, a machine check interrupt indicating the appropriate level of damage as defined by the ESA/390 POP (such as a system damage machine check or instruction processing damage) is presented. If the checkpoint is valid, a machine check is only generated if a retry threshold (e.g. seven retry attempts unsuccessful) is reached. The next step, also initiated by the PCE 216, is to run a special microcode routine which uses the recovery footprint information in the Recovery Control Register to take the appropriate recovery actions.

As discussed earlier, each of the registers 502a-b, 504a-b is divided into two groups of bits. The bits in registers 502a and 504a are used as single bits, each with a specific meaning which informs the recovery microcode of any type of special action which is required to return the CP to a logically consistent state. The bits can be set simultaneously and are usually used by more than one operation. One such bit is the "Working Regs Required" bit which indicates that data or addresses required for recovery have been saved in the Working Registers in the SXE. Another example is "Control Block Locked" meaning that the CP has a softlock out in storage. The bits contained in the second half of both the staged and immediate registers 502b and 504b contain an encoded algorithm number which indicates to the microcode that a specific instruction recovery algorithm needs to be executed (i.e. that a specific operation was in progress at the time of the error) for example "SET CLOCK In Progress".

The various code points are defined, set and interpreted by CP microcode. This removes any dependency on the hardware and gives CP microcode flexibility to add new code points and modify existing ones. The code points and definitions are made based on what microcode algorithm sets them and which recovery algorithm interprets them.

The recovery control register always contains the correct recovery algorithm for a given state of the machine since it is loaded in synchronization with the state changes where critical. Therefore there is no ambiguity as to when the algorithm was set and whether or not the machine state change actually took place.

The ESA/390 architecture requires that certain instructions "checkpoint synchronize". Further, some instructions are specified to checkpoint synchronize before execution, others after execution, and some both. At the time of an architected checkpoint synchronizing action, all errors associated with execution of instructions prior to that action must be checked for and reported with the appropriate instruction address. By doing this, software can determine in which software checkpoint interval an error occurred and which group of instructions were affected. It can then take the appropriate software recovery action.

In the CP of FIG. 2, all errors associated with any facility are reported before the instruction completes except errors occurring to stores. Stores are marked completed in the store buffers but still have to be written into the high speed buffers. Errors occurring to stores to program storage in this window must be reported to the software via a machine check interrupt where the storage logical validity bit is zero as defined in the ESA/390 POP. Additionally, it must be associated with the correct software checkpoint interval.

Checkpoint synchronization adds another dimension to the type categorization of an operation. In the ESA/390 POP, checkpoint synchronizing instructions are found in all three types of operations. Unconditional branches (BCR OF) and Set Address Space Control (SAC) are Type 1 instructions that checkpoint synchronize. Load PSW is a Type 2 checkpoint synchronizer and many of the I/O instructions are Type 3 operations which checkpoint synchronize.

Type 1 instructions are prevented from completing until all previous stores have reached the high speed buffers. Type 2 and 3 instructions are prevented from establishing any intermediate retry checkpoints until all previous stores have reached the high speed buffers and they themselves are prevented from completing until their own stores are in the high speed buffers. The result is that for Type 2 and Type 3 instructions, an additional recovery window exists at the end of each instruction when it is waiting for its stores to clear. If an error occurs, the recovery algorithm will adjust the instruction address to indicate the failing software checkpoint interval. This recovery algorithm therefore becomes part of the recovery actions for all Type 2 and 3 checkpoint synchronizers in addition to their own unique recovery algorithms.

The next section will present two detailed examples of Type 3 instructions illustrating how checkpoints are established, the use of the Recovery Control Register to maintain and synchronize recovery footprints and the algorithms used to retry these operations.

The ESA/390 POP instruction PAGE-IN moves a 4k page of data from the Expanded Store 212 to the Central Storage 208 and is executed by the SXE 328. It is a synchronous instruction meaning that the movement of data must be completed at the time the instruction is completed. The ESA/390 POP requires this instruction to architecturally checkpoint synchronize before and after it is executed.

Figure 6A:
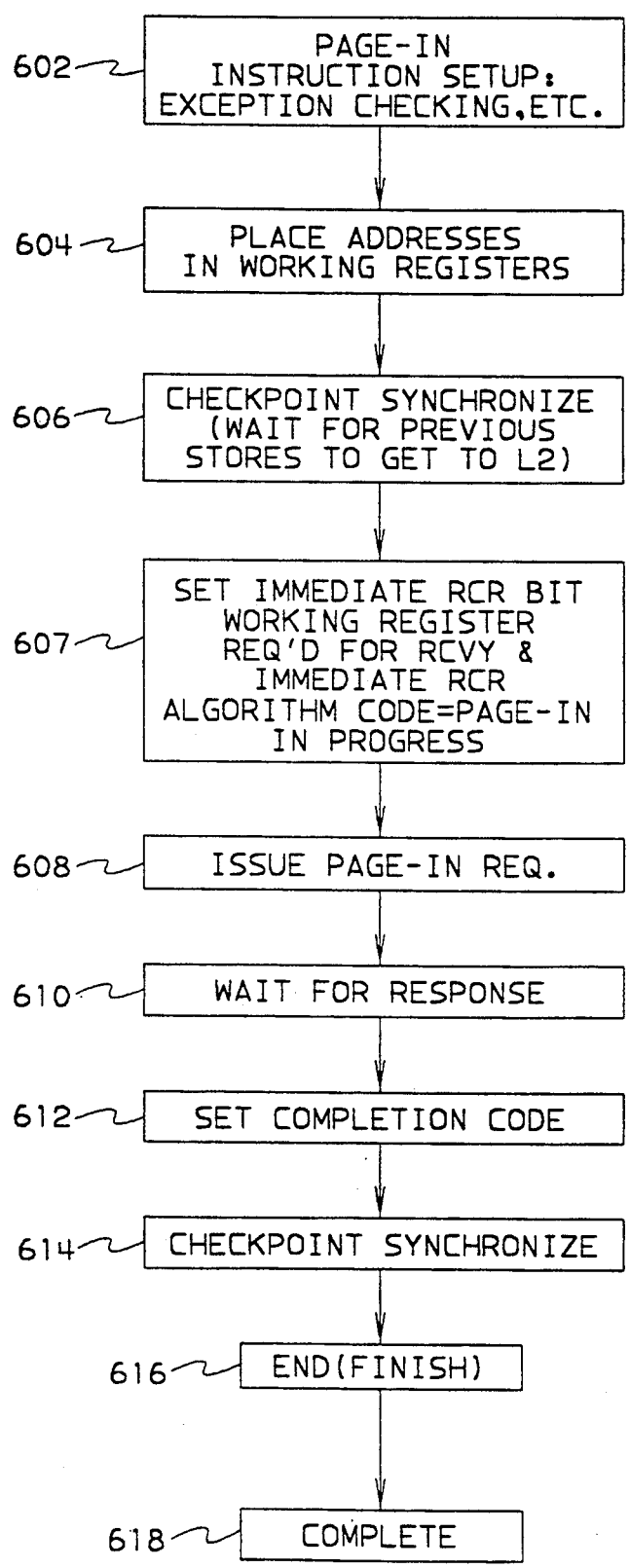
FIG. 6A is a flow diagram showing the execution of a PAGE IN instruction.

FIG. 6A is a flow diagram showing the execution steps for a PAGE-IN instruction. The first step 602 of a PAGE-IN instruction consists of instruction setup, exception checking, operand address calculation, etc. Next, in step 604, the operand addresses are saved in the SXE's working registers for use later by recovery if an error occurs. At this point, all of the set-up type work has been completed but no architected facilities have been modified. Since this operation is required to checkpoint synchronize by the architecture, it must now wait (step 606) until all stores from previous instructions are safely putaway in the high speed buffers. Note that this waiting step was executed as late as possible in the execution of the page instruction so that the storing process could be overlapped with the instruction setup. The microcode is now ready to issue the page request.

In step 607, bits in the immediate Recovery Control Register indicating that the "Working Registers are Required for Recovery" and "Page-In in Progress" are set and the page request is issued in step 608. Note that the Immediate Recovery Control Register is used in this case because in this embodiment, the release of the Page Request takes place immediately and is not synchronized with an instruction complete. The microcode then waits for a response to the page request indicating the status (step 610) and the Condition Code is set accordingly (step 612). Settings of the Condition Code for the PAGE IN instruction is described in detail in the 390/ESA POP.

Once the response to the page request has been received and the Condition Code set, the processor has completed the execution phase of the operation. Microcode then checkpoint synchronizes (in step 614) as required by the architecture and finishes the instruction (in step 616). Finally, in step 618, the Completion/Interruption Logic 340 issues a Completion Report for the PAGE IN. As a result of the Completion Report, both the Immediate and the Staged Recovery Control Register are cleared.

Figure 6B:
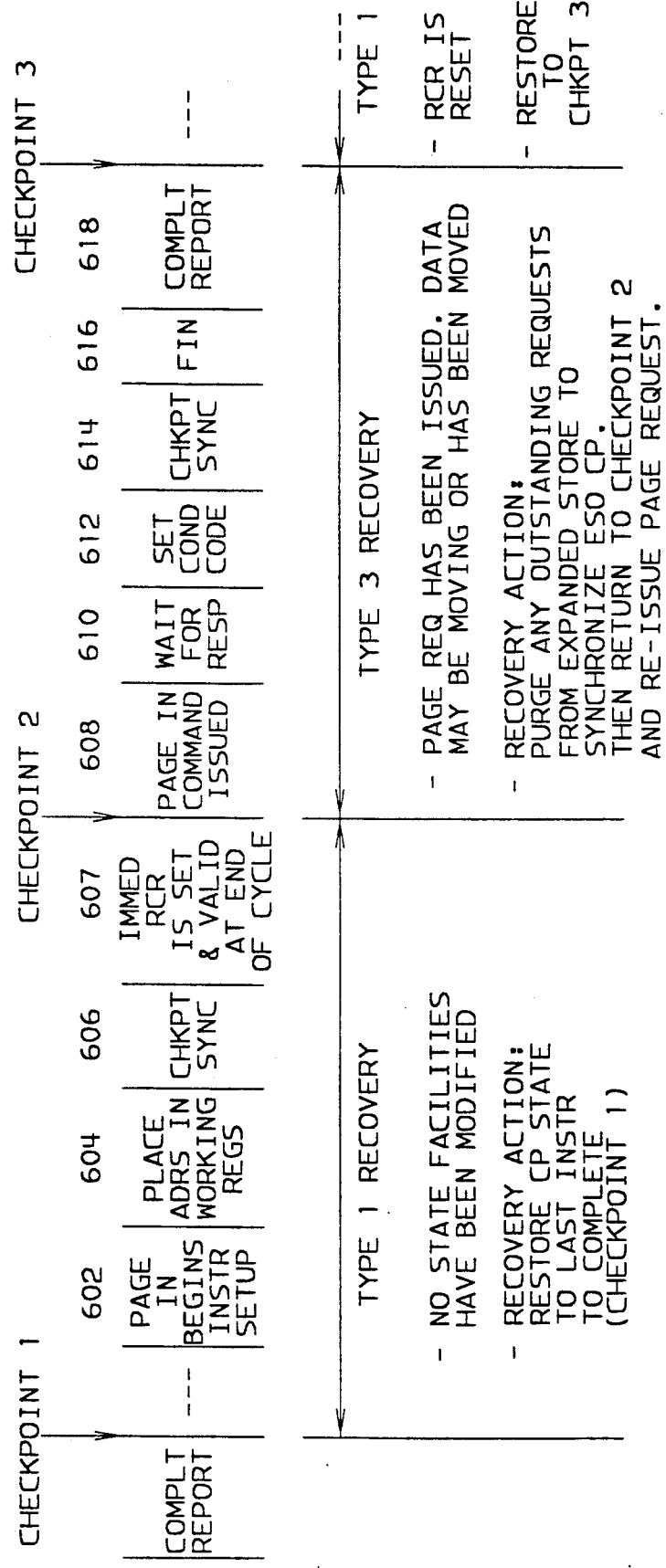
FIG. 6B is a timing diagram showing the different phases of execution (recovery windows) of a PAGE IN instruction and the required recovery actions for failures occurring in each of the phases.

FIG. 6B is a time line showing the execution steps of a PAGE IN instruction, points at which new checkpoints are established, and the various recovery windows. Checkpoint 1 is established as a result of the last instruction to complete. From that point up to and including step 607, the PAGE IN instruction is still in a Type 1 recovery window. No facilities have been updated that cannot be undone and no other element has seen any of its results. An error occurring in this window will cause the processor to return to Checkpoint 1. The RCR has a value of 0 defined for this implementation to mean no special handling required. Therefore decoding and execution picks up from Checkpoint 1.

Checkpoint 2 is established when the Immediate Recovery Control Register is set as a result of step 607. Then a paging request is issued. From this point on, other elements can see the data being paged into Main Storage and the state of the system cannot be returned to that of Checkpoint 1. The architecture however allows for multiple storage access for paging instructions so if an error occurs after checkpoint 2 has been established, when the recovery process interrogates the recovery control register, it will see the "Working Registers required for Recovery" bit on and the "Page In" in progress algorithm code. This will cause recovery microcode to run a special routine to handle this case.

The "Working Registers Required for Recovery" (WRRR) bit indicates that data that is required for the algorithm, in this case the Main Store address and the Expanded Storage Block number, is in the Working Registers. If an error occurred such that the data in the working registers was damaged, recovery of this operation would not be possible. When the WRRR bit is not set, the data in the working registers can be refreshed or reset to allow recovery from errors affecting them. If the data in the Working Registers was not damaged by the error, the microcode recovery routine will proceed to recover the Page instruction. The first step in this recovery is to purge any outstanding paging requests. This will resynchronize the Expanded Store with the Processor. Next recovery microcode will reissue the paging request to the Expanded Store and complete the operation under recovery control. At the completion of recovery, a completion report is also generated which will reset the Recovery Control Register and execution will resume as normal.

I/O instructions and interruptions as defined in the ESA/390 POP may be classified into four categories:

a. I/O instructions which communicate asynchronously with the I/O Subsystem;

b. I/O Instructions which communicate synchronously with the I/O Subsystem;

c. I/O instructions which do not communicate with the I/O Subsystem; and d. I/O interruptions.

In this context, synchronous communication with the I/O subsystem means that the Central Processor 202a-c requests the I/O subsystem to perform a function and waits until the I/O subsystem has completed the task before completing the instruction and continuing to the next instruction in the instruction stream. Asynchronous communication means that once a function is requested by the Central Processor, the Central Processor completes the instruction and continues with the next instruction in the instruction stream without waiting for the I/O Subsystem to complete the requested function.

The Central Processors 202a-c communicate with the I/O subsystem using data areas in storage called control blocks. The Central Processor signals the I/O subsystem when a request is made pending in a control block to provide initiative to the I/O Subsystem to fetch the control blocks and look for requests. Likewise, the I/O subsystem signals the Central Processor when an I/O interrupt is made pending.

The basic strategy of I/O recovery is to back the system up to a checkpoint before the execution of the I/O operation. This is not always possible because the architected state of the system is updated during the execution of operation. The strategy in these cases is to return to an intermediate checkpoint and finish the execution of the instruction or interrupt.

FIGS. 7A, 8A, 9A and 10A are flow diagrams illustrating the flow of execution as it pertains to recovery for instructions which communicate asynchronously with the I/O subsystem, instructions which do not communicate with the I/O subsystem, I/O interrupts and instructions which communicate synchronously with I/O subsystem respectively. FIGS. 7B, 8B, 9B, and 10B are time lines showing the execution steps of these I/O operations, points at which new checkpoints are established and the various recovery windows. Steps labelled with the same numbers indicate corresponding steps in FIGS. 7A and 7B, 8A and 8B, 9A and 9B, and 10A and 10B.

Figure 7A:
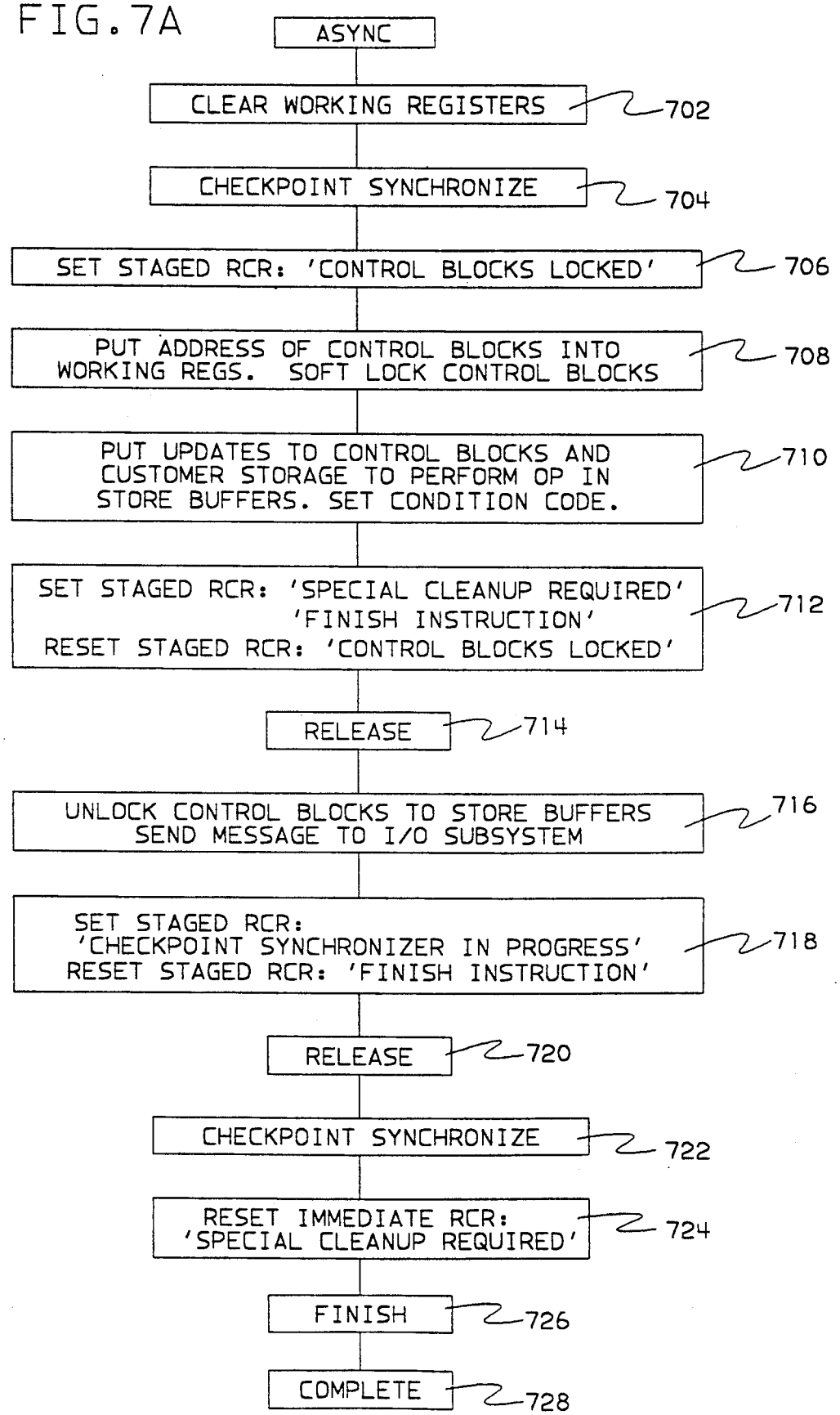
FIG. 7A is a flow diagram showing the execution of I/O instructions which communicate asynchronously with the I/O Subsystem.

To execute an I/O instruction which communicates asynchronously with the I/O subsystem of FIG. 2, first working registers used to save the addresses of the control blocks to be locked are cleared in step 702 in FIG. 7A. The Central Processor then checkpoint synchronizes, in step 704, by waiting for all stores from previous instructions to be written into the high speed buffers. This must be done before any stores for the I/O instruction are released or any architected facility irrevocably changed. Next, step 706 sets the "Control Block Locked" bit (CBL) in the staged RCR. This footprint does not become effective (loaded into the immediate RCR) until a completion report is received. In step 708, the Central Processor places the addresses of the control blocks in the working registers and obtains soft locks for the control blocks it is about to update. The softlocks are obtained using the interlocked updates described earlier. If multiple control blocks are required, then a locking protocol must be observed to prevent deadlocks. Such locking protocols are well known in the art.

Storing of the softlocks is accomplished with a Release which in turn results in an intermediate Completion Report. The intermediate Completion Report causes the store of the first softlock to become visible at the same time the immediate RCR is set. The CP now enters its first Type 3 recovery window.

In step 710, the Central Processor places the changes to the control blocks and program storage into the store buffers and sets the Condition Code. The Condition Code is protected with a checkpoint facility so that this update can be undone in the event of an error occurring before this recovery window has completed.

The staged RCR is then updated to reflect the changes to the control blocks and program storage which are buffered in the store buffers. The required recovery algorithm is changed by resetting the CBL bit and setting the "Special Clean-Up Required" (SPC) and the "Finish Instruction" (FIN) bits in the staged RCR in step 712.

The Completion Report resulting from the Release issued in step 714 establishes a new checkpoint by simultaneously making the changes in the store buffers visible, updating the Condition Code, and the immediate RCR. The CP now enters the second Type 3 recovery window for this type of I/O operation.

Functionally all the changes required to execute this instruction have been completed at this point except for updating the instruction address. In step 716, a signal is sent to the I/O subsystem indicating that a request is pending and the CP begins the process of unlocking the control blocks by resetting the lock values in the control blocks and placing them in the store buffers.

The required recovery algorithm is again changed by resetting the FIN bit and setting the "Checkpoint Synchronizer in Progress" (CKPT) bit in the staged RCR in step 718. The SPC bit is not modified and therefore remains on.

The Completion Report resulting from the release issued in step 720 establishes a new checkpoint by simultaneously making the changes in the store buffers visible and updating the immediate RCR. Then, in step 722, the CP checkpoint synchronizes by waiting for all of its stores to be written into the high speed buffers.

Once the stores have been completed, the immediate RCR SPC is reset (step 724). The CKPT bit is not modified and therefore remains set. Finally a finish report is issued in step 726 and the operation is completed by the generation of the Completion Report in step 728.

Figure 7B:
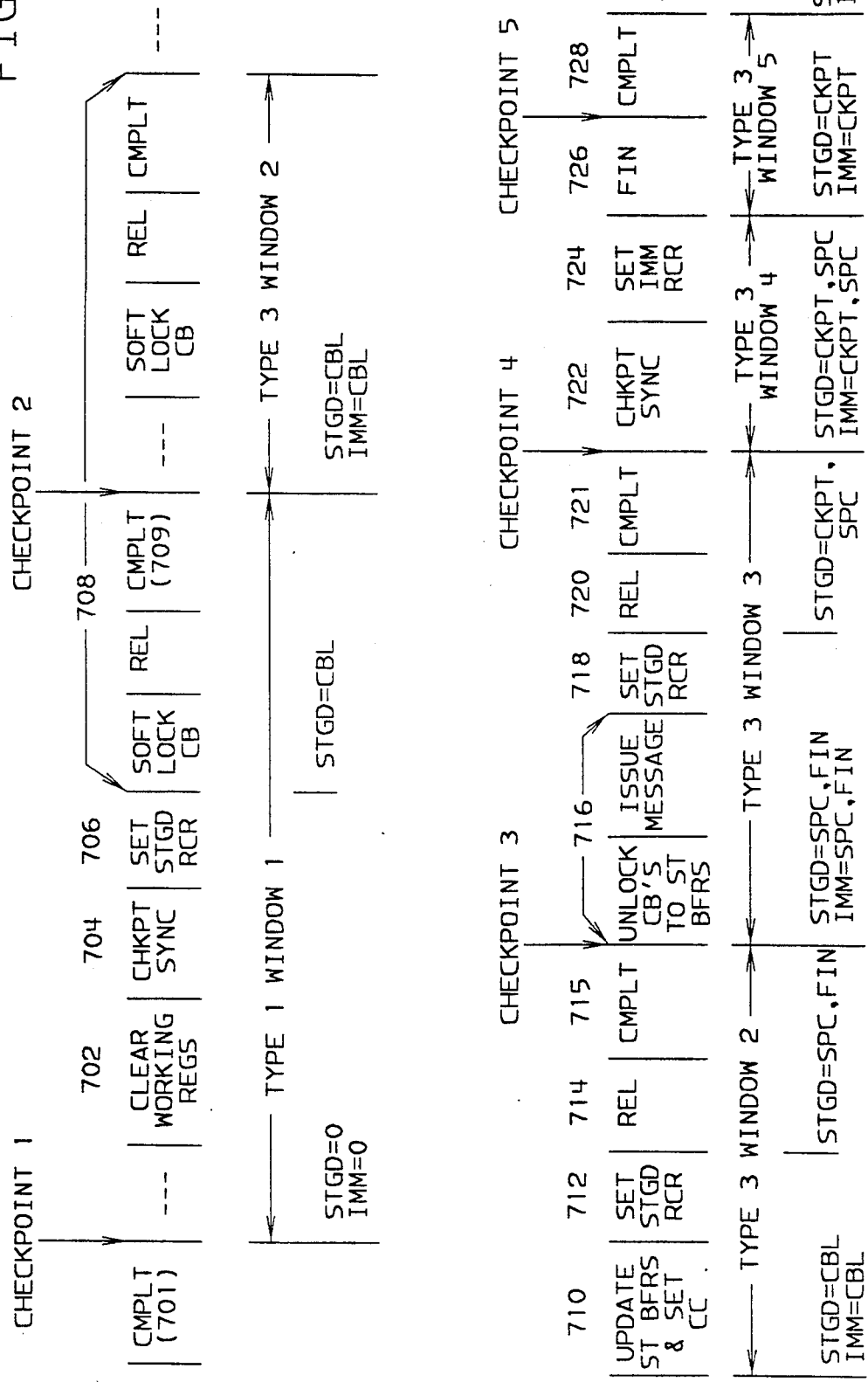
FIG. 7B is a timing diagram showing the different phases of execution (recovery windows) of I/O instructions which communicate asynchronously with the I/O Subsystem and the required recovery actions for failures occuring in each of the phases.

FIG. 7B shows the same execution steps as 7a on a timeline along with the recovery windows and values of the staged and immediate RCRs.

Checkpoint 1 is established at the completion of the last operation 701. The CP remains in a Type 1 recovery window (WINDOW 1) until Completion Report 709 is issued. Before Completion Report 709, no changes have been made visible to the rest of the system. The recovery action in the event of an error is to return the state of the processor to Checkpoint 1 and begin processing. This is indicated to the recovery microcode by the immediate RCR value of 0.

The next checkpoint (Checkpoint 2) is established as a result of Completion Report 709. At this point, storage has been modified since an updated softlock has been made visible. The CBL bit is set in the immediate RCR as a result of Completion Report 709. This bit was set up earlier in the staged RCR as a result of step 706 but did not become effective until Completion Report 709. Step 708 may consist of obtaining several softlocks. The immediate RCR CBL bit remains on during this period across the multiple releases.

Checkpoints 1 and 2 are equivalent except for the softlocks in storage. Since the softlocks have not changed the architected state of the system or caused a reaction in another element, the CP can return to Checkpoint 1 by unlocking the softlocks. If an error occurs during WINDOW 2, the immediate RCR CBL bit will be on indicating to recovery microcode that control blocks are locked. Recovery microcode will therefore unlock the control blocks whose addresses were saved in the Working Registers and thereby return the CP to Checkpoint 1.

Saving the addresses in the Working Registers saves recovery microcode time when unlocking the control blocks. An alternative approach is to keep only an indication that a control block is locked and then search all the control blocks for the recovering CP's lock id. This technique can also be used in the event that the addresses in the Working Registers are themselves contaminated by the error.

By being able to return the CP to Checkpoint 1, no knowledge of the unique I/O operation being executed at the time of the error need be saved to recover processing.

Checkpoint 3 is established by Completion Report 715 which results from Release 714. Completion Report 715 causes architected changes to the control blocks and storage and updates to the Condition Code (as in step 710) to be made visible. Simultaneously the immediate RCR CBL bit is reset and the immediate RCR SPC and FIN bits are set. In the event of an error during WINDOW 3, the CP is returned to Checkpoint 3. Since architected facilities have been changed in Checkpoint 3 and can be seen by other system elements, the CP is no longer able to undo these changes and return to Checkpoint. Therefore, the recovery action taken is to complete the instruction. Note, however, that all of the instruction unique changes required to execute the instruction, including updating the Condition Code, have taken place simultaneously as a result of Completion Report 715. Therefore, the immediate RCR FIN bit indicates to microcode that all that is required to finish this instruction is to unlock the control blocks, send a signal to the I/O subsystem, checkpoint synchronize and update the instruction address. This action is the same for all instruction in this category, therefore no knowledge of which specific instruction is being executed is required.

In the system of FIG. 2, the I/O subsystem is designed to use the control blocks as the master copy of the request. It is possible that if WINDOW 3 is retried due to an error, more than one signal will be issued to the I/O subsystem for one request. Because the I/O subsystem uses the control blocks as the actual request, it will discard any subsequent signals it received if it has already serviced the request.

The SPC RCR bit indicates to the recovery microcode that special action is required in the event that an error damages a store. In this case, control blocks in storage could enter an inconsistent state. If a store error occurs while the SPC bit is on, recovery microcode will take a more drastic action including resetting and/or rebuilding the I/O control blocks. This could result in an Instruction Processing Damage and/or Channel Report Word Pending machine check interrupt but is required in order to return the system to an operational state. The meaning of these machine check interrupts is described in the ESA/390 POP.

Checkpoint 4 is established by Completion Report 721 as a result of Release 720. Completion Report 721 causes all the softlocks to be unlocked. After Completion Report 721 has been issued the only remaining step in completing the instruction is to checkpoint synchronize and update the instruction address if required. If the instruction address was loaded due to a PSW swap or branch, the instruction address is not incremented. The CKPT bit indicates that this action is required if an error occurs during this period. A separate bit is used to indicate this action is required to allow use of a common recovery algorithm by all operations that checkpoint synchronize. The SPC bit remains on until the checkpoint synchronization has been cleared. At that point, all the control blocks have been safely put away in the high speed buffers and escalation to a more severe action is no longer required.

The five recovery windows in an I/O instruction that communicates asynchronously with the I/O subsystem are the same for all instructions in this category and are indicated to recovery microcode using four unique RCR bits: CBL, SPC, FIN, CKPT.

Figure 8A:
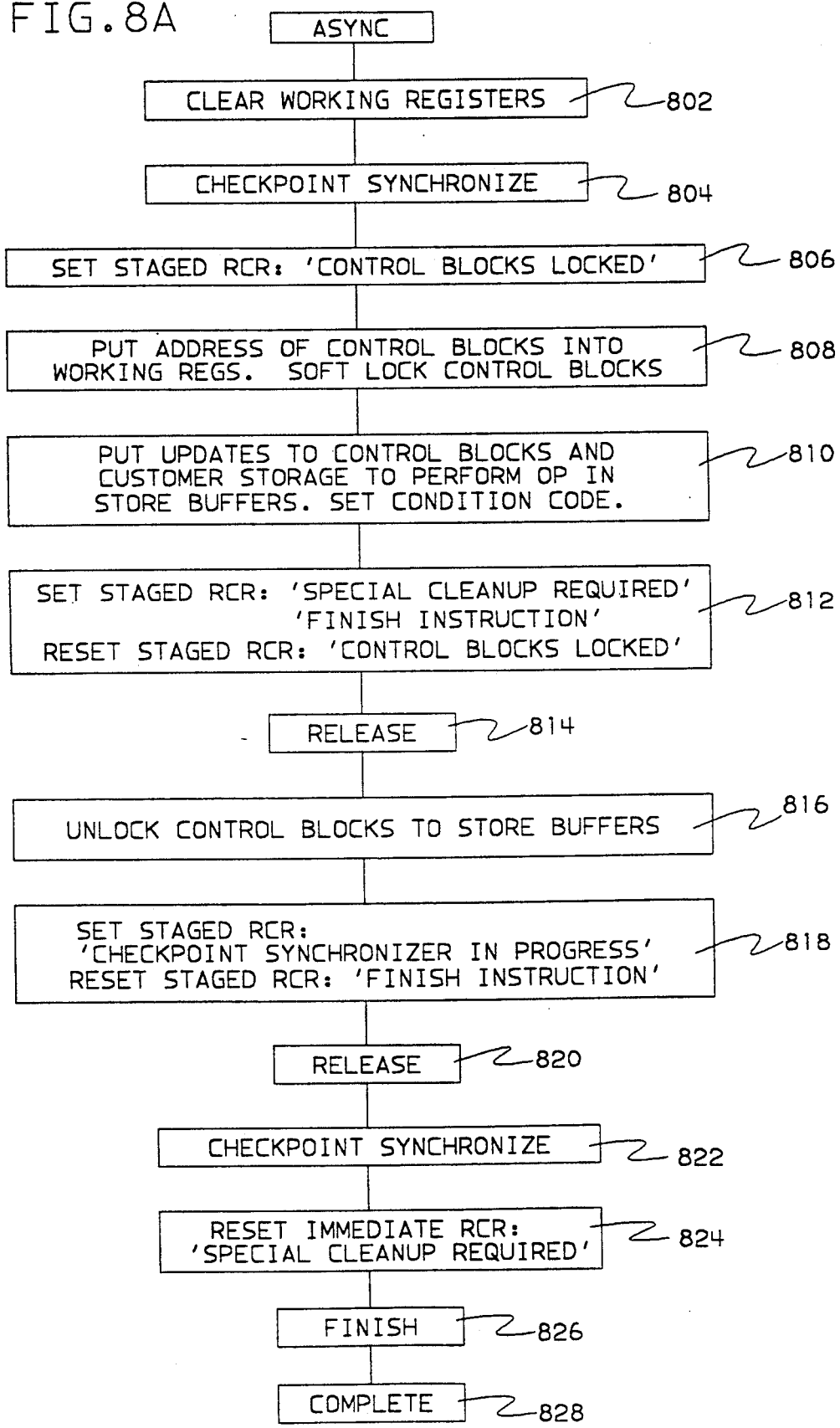
FIG. 8A is a flow diagram showing the execution of I/O instructions which do not communicate with the I/O Subsystem.
Figure 8B:
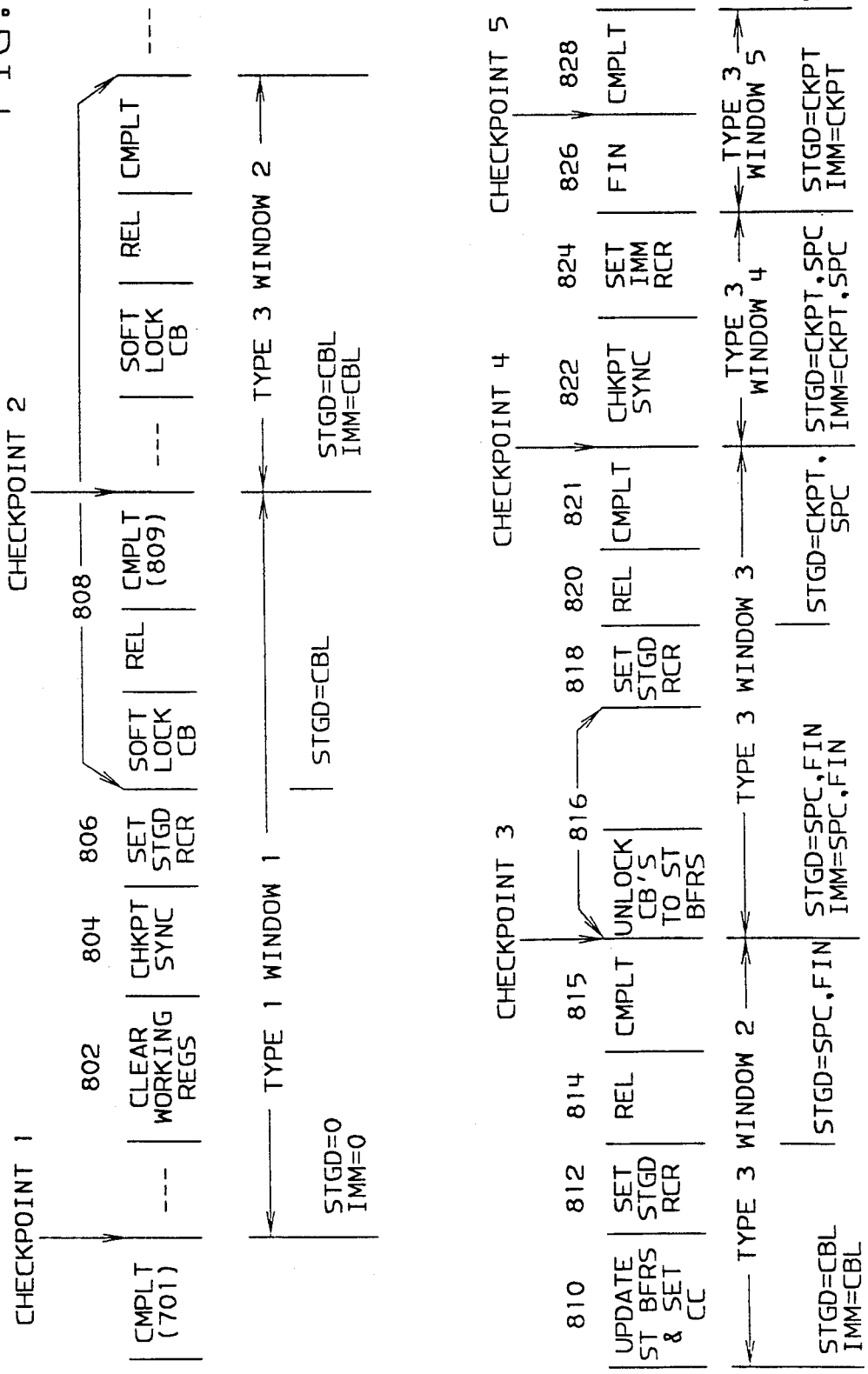
FIG. 8B is a timing diagram showing the different phases of execution (recovery windows) of I/O instructions which do not communicate with the I/O Subsystem and the required recovery actions for failures occurring in each of the phases.

FIG. 8A is a flow diagram showing the execution steps for I/O instructions which do not communicate with the I/O Subsystem and FIG. 8b is a timeline showing the recovery windows for the same category of I/O instructions. With the exception of step 816, the steps 802-828 are identical to their counterparts (702-728) in FIG. 7A. Execution of these instructions differ from instructions that communicate with the I/O Subsystem (FIG. 7A) in step 816 which corresponds to step 716. As is apparent from FIG. 8A, no message is issued to the I/O Subsystem in step 816. All of the recovery windows are the same as are the RCR bits used to indicate required recovery actions. Because the I/O subsystem is designed to handle false signals, the same FIN bit can be used for both instructions which communicate asynchronously and those which do not communicate with the I/O subsystem.

Figure 9A:
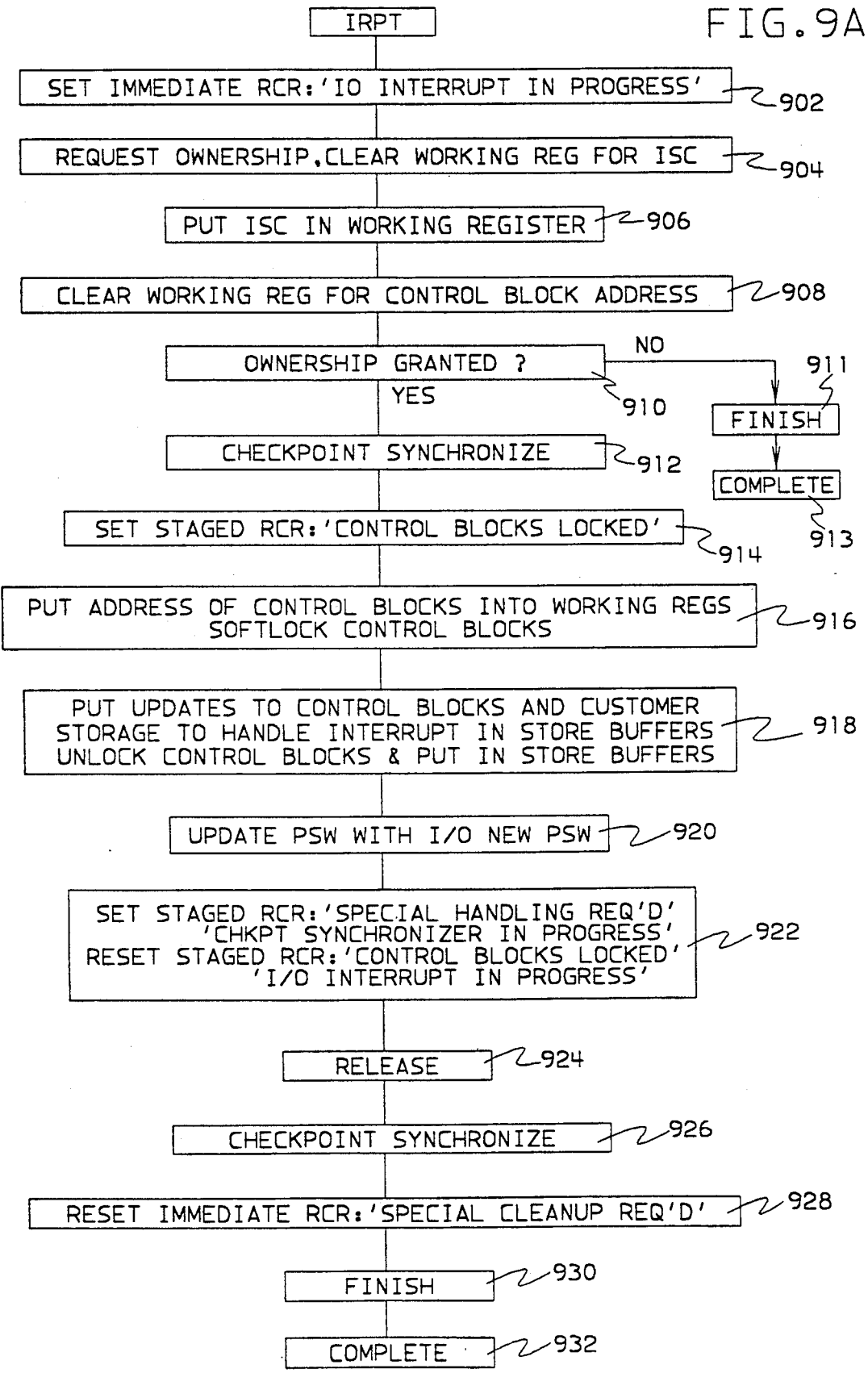
FIG. 9A is a flow diagram showing the execution of I/O interrupt.

FIG. 9A is a flow diagram of the execution steps for I/O interrupts and FIG. 9B is the corresponding timeline diagram. Execution of interrupts differs somewhat from that of instructions which communicate asynchronously and those which do not communicate with the I/O subsystem. Therefore a new RCR bit is introduced, "I/O Interrupt in Progress" (IRPT) which is set in step 902. The CP then requests ownership of the I/O interrupt in step 904. In one embodiment, ownership can be granted to one CP by some arbitration process. When one CP has been selected, the interrupt is reset in all other CP's to save them from falsely being interrupted. The requesting CP then saves the I/O subclass it is working on in a Working Register (step 906) and initializes other Working Registers (step 908).

In step 910, the CP determines whether it has been granted ownership of the interrupt. If it was not selected to handle the interrupt (i.e. not granted ownership), it ends interrupt processing and returns to the instruction stream. This is done by issuing a finish report 911 which results in a completion report 913 and instruction processing resumes. Once the requesting CP has determined that it has been granted ownership of the interrupt, it checkpoint synchronizes (step 912). This is done before any architected facilities are irrevocably modified and storage is updated by this interrupt. The CP then sets the CBL bit in the staged RCR (step 914) and begins softlocking the required control blocks (step 916).

In step 918, updates to program storage and architected fields in the control blocks are placed in the store buffers. Then, in step 920, the I/O new PSW is fetched and placed in the PSW. The PSW is also protected with a checkpoint facility for holding its checkpoint value. In step 922. the staged RCR bits SPC and CKPT are set and CBL and IRPT are reset. Next, in step 924, a Release is issued whose corresponding Completion Report causes storage, the PSW and the immediate RCR to be updated simultaneously.

In step 926, the CP checkpoint synchronizes to insure all control blocks and architected storage are successfully updated before proceeding. At this point, special clean up is no longer required since the control blocks have been stored successfully into the high speed buffers and the SPC bit is reset (step 928). A finish report is then issued, (step 930), which results in a final Completion Report (step 932).

Many of the recovery actions required by I/O interrupts are the same as those required by instructions which communicate asynchronously with the I/O subsystem and those which do not communicate with the I/O subsystem. Therefore I/O interrupts make use of the same RCR bits and recovery algorithms: SPC, CBL and CKPT. The IRPT bit indicates to CP recovery microcode that the interrupt initiative may have been reset in all CP's since ownership had been requested. If an error occurs in WINDOWS 2 or 3 of an I/O interrupt, recovery code running on the recovering CP will search the control blocks for any pending I/O interrupts and signal all CP's to set the interrupt pending indicator on again, thus reestablishing interrupt initiative. Therefore to recover I/O interrupts only one additional RCR bit and recovery algorithm is required. To save time in recovery, information about which interrupt was being worked on can be saved and only that particular interrupt reestablished.

Figure 10A:
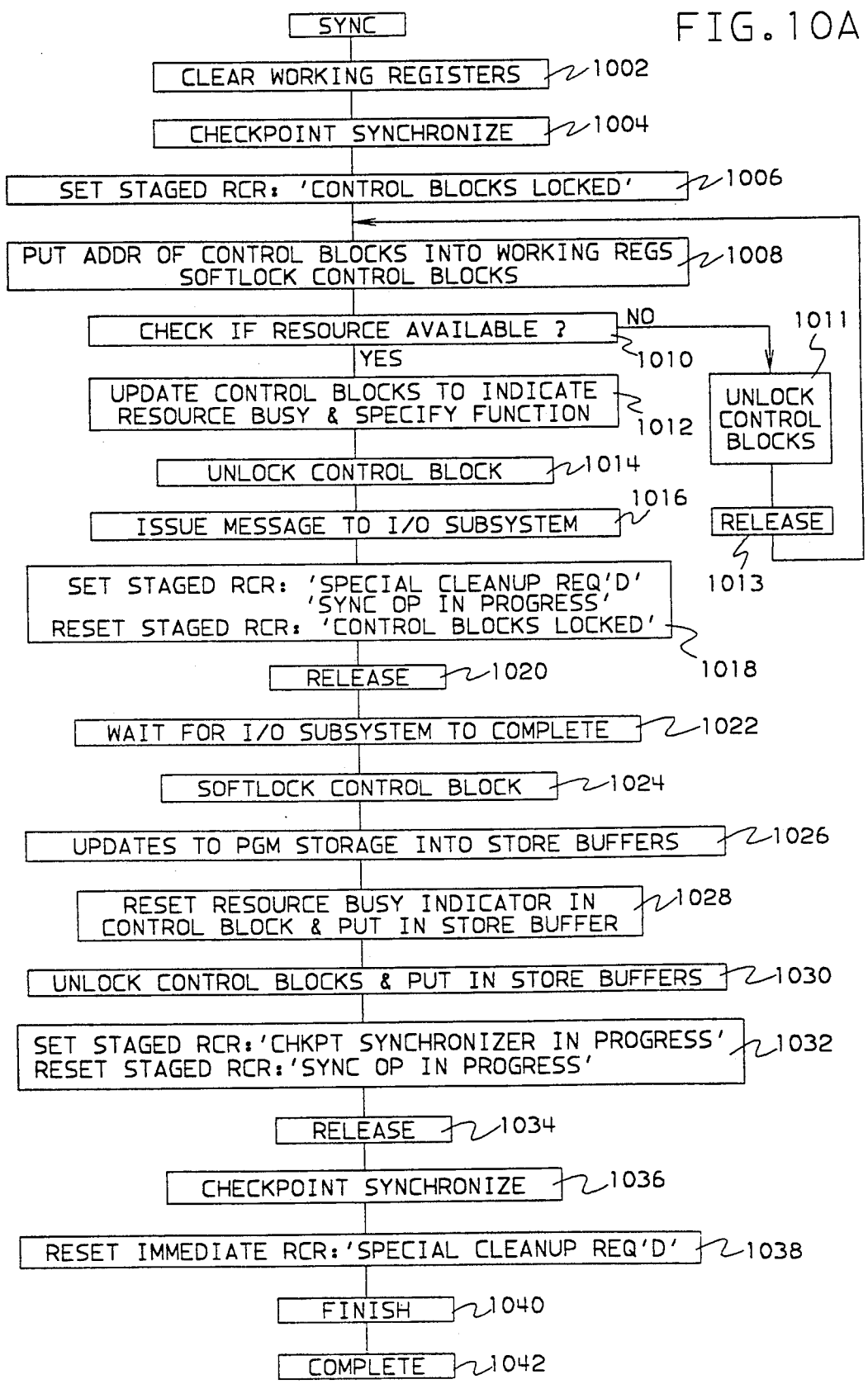
FIG. 10A is a flow diagram showing the execution of I/O instructions which communicate synchronously with the I/O Subsystem.
Figure 10B:
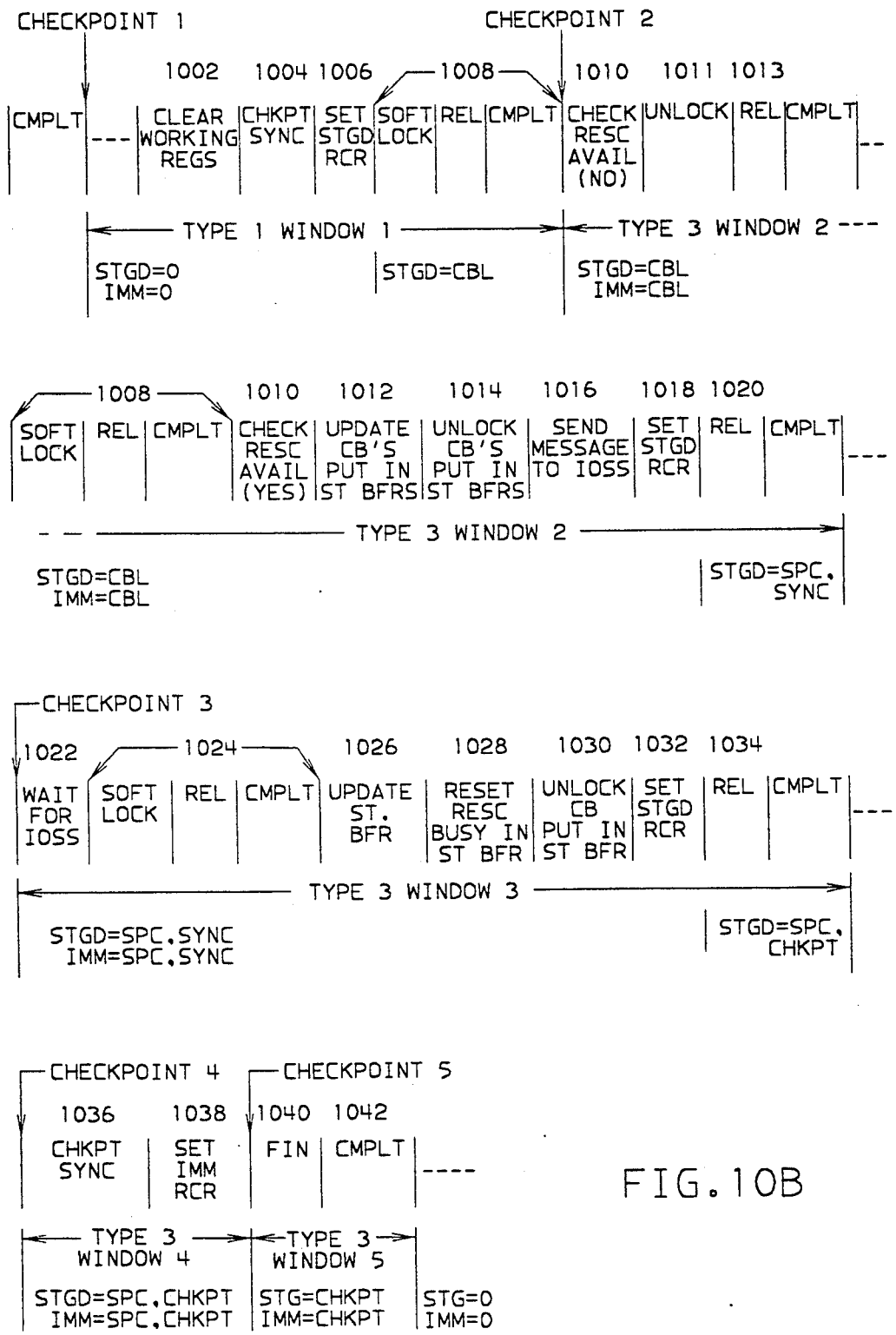
FIG. 10B is a timing diagram showing the different phases of execution (recovery windows) of I/O instructions which communicate synchronously with the I/O Subsystem and the required recovery actions for failures occurring in each of the phases.

FIG. 10A is a flow diagram of the execution of an I/O instruction which communicates synchronously with the I/O subsystem and FIG. 10B is its corresponding execution timeline.

In the system of FIG. 2, instructions which communicate synchronously with the I/O subsystem must wait until the resources to execute the function are available. This is also determined through the use of control blocks. Instructions which communicate synchronously therefore initialize the Working Registers, (step 1002), checkpoint synchronize (step 1004), and then begin obtaining softlocks for control blocks (step 1006) and placing the addresses of the locks into the working registers (step 1008). Once the softlocks for the resource required to execute the function is obtained the CP can examine the control block to determine if the resource is busy (step 1010). If the resource is not available, locking protocol may require that other softlocks previously obtained be released before subsequent attempts at locking the resource are made. This is done by resetting the lock ID in the control blocks and placing the update in the control block (step 1011) followed by a release signal to cause the stores to be made visible (step 1013).

If the resource is available, the updates to the control block to indicate that the resource is now in use and the required function are placed in the store buffers (step 1012) and the softlock on the control block is unlocked (also buffered in the store buffers) (step 014). Next, a message requesting the function be performed is issued to the I/O subsystem (step 1016). The SPC staged RCR bit along with a new staged RCR bit indicating that an instruction which communicates synchronously is in progress (SYNC) are set. The staged RCR CBL bit is reset (in step 1018) and a Release is then issued (in step 1020). The resulting Completion Report causes the control blocks to be updated and the immediate RCR to be set. The CP then waits for the I/O subsystem to complete its task (step 1022). Next, the CP softlocks the control blocks containing the result of the I/O operation (step 1024) and places that result into the store buffers to be stored into program storage (step 1026). It then puts the updates to the control blocks to release the resource (step 1028) and the reset lock values for the control blocks into the store buffers (step 1030).

Next, the staged RCR is updated to indicate the new checkpoint by setting the CKPT bit and resetting the SYNC bit (step 1032). A Release is then issued (step 1034). The CP then checkpoint synchronizes (step 1036), resets the SPC bit (step 1038) and finishes (step 1040). Finally, the instruction completes (step 1042).

FIG. 10B is a timing diagram showing the different phases of execution (recovery windows) of I/O instructions which communicate synchronously with the I/O Subsystem and the required recovery actions for failures occurring in each of the phases. The reference numerals in FIG. 10B correspond with the aforedescribed steps in FIG. 10B.

The SPC, CKPT and CBL RCR bits have the same recovery actions as for the other I/O operations. If an error occurs while the SYNC bit is set in the immediate RCR, CP Recovery microcode will pick up execution of the instruction from Checkpoint 3 and complete it under recovery control.

Thus, only six RCR bits and unique actions are required to recover all windows of all I/O instructions and interrupts. Establishing checkpoints in such a fashion minimizes the number of algorithms while maximizing the recovery effectiveness.

While the invention has been described with reference to the preferred embodiments, various modifications and changes will become apparent to those of skill in the art which may be made without departing from the true spirit and scope of the invention as defined by the appended claims.

Having thus described our invention, what we claim as new and desire to secure Letter Patent is:

1. A recovery control register for use with an error recovery system, comprising:
   a first register;
   a second register, coupled to said first register, said second register being connected to provide data directly to said error recovery system;
   means for selecting one of said first register and said second register;
   means for transferring said data from said first register to said second register synchronously with a system checkpoint.

2. The recovery control register of claim 1, further comprising:
   modification means, coupled to said first register, for logically operating on data in said first register.

3. The recovery control register of claim 1 wherein said first and second register further comprise:
   a first portion for storing encoded data indicative of a recovery control algorithm; and
   a second portion for storing status information indicative of progress of execution of an instruction at the time of an error.

4. The recovery control register of claim 1 wherein said modification means is connected to receive an input from an output of said first register.

5. A recovery control system for recovering from an error occurring during execution of a stream of instructions by a processor, comprising:
   checkpoint means, for establishing a checkpoint at completion of each of said instructions;
   error detection means for detecting said error;
   determining means for selecting an error recovery process to be executed when said error detection means detects an error and for generating a code indicative of said error handling processes,
   a recovery control register, comprising:
      a first register;
      a second register, coupled to said first register; said second register being connected to provide data directly to said error recovery system;
      selection means, coupled to said determining means, for selecting one of said first register and said second register to receive said error handling code;
      transfer means, coupled to said checkpoint means, for transferring said data from said first register to said second register synchronously with said occurrence of said checkpoint; and,
      recovery means, coupled to said second register, for executing said recovery processes indicated by said code in said second register.

6. The recovery control system of claim 5, wherein said recover control register further comprises:
   modification means for logically operating on data in said first register.

7. The recovery control system of claim 5 wherein each of said first and second register further comprise:
   a first portion for storing status information indicative of progress of execution of an instruction at the time of an error; and,
   a second portion for storing encoded data indicative of a recovery control algorithm;

8. The recovery control system of claim 5 wherein said checkpoint means comprises means for generating an intermediate completion report and a final completion report for each of said checkpoints and wherein said transfer means transfers said data from said first register to said second register on receipt of said intermediate completion report.

9. The recovery control system of claim 5 further comprising:
   register reset means, coupled to said checkpoint means said first register and said second register, for resetting said first register and said second register on receipt of said final completion report.

10. A recovery control system for recovering from an error occurring during execution of a stream of instructions by a processor, comprising:
    a) checkpoint means, for establishing a checkpoint at completion of each of said instructions and means for generating an intermediate completion report and a final completion report for each of said checkpoints;
    b) error detection means for detecting said error;
    c) recovery control means for determining for monitoring operations in progress in said processor, for selecting an error recovery process to be executed when said error detection means detects an error and for generating a code indicative of said error handling processes,
    d) a recovery control register, comprising:
       i) a first register;
       ii) a second register, coupled to said first register; said second register, said second register being connected to provide data directly to said error recovery system;
       iii) each of said first register and said second register comprising a first portion for storing status information indicative of progress of execution of an instruction at the time of an error and a second portion for storing encoded data indicative of a recovery control algorithm;

iv) selection means, coupled to said determining means, for selecting one of said first register and said second register to receive said error handling code;

v) transfer means, coupled to said checkpoint means, for transferring said data from said first register to said second register on receipt of said intermediate completion report;

vi) modification means, coupled to said recovery control means and said first register, for logically operating on data in said first portion of said first register responsive to signals from said recovery control means;

vii) register reset means, coupled to said checkpoint means said first register and said second register, for resetting said first register and said second register on receipt of said final completion report; and, e) recovery means, coupled to said second register, for executing said recovery processes indicated by said code in said second register.

11. A method of recovering from an error occurring during execution of a stream of instructions by a processor, comprising the steps of:

establishing a checkpoint at completion of each of said instructions;

determining an operation in progress during said execution;

responsive to said determining, selecting an error recovery process to be executed when said error is detected;

generating a code indicative of said error handling processes;

temporarily storing said code;

detecting said error;

providing said code to an error recovery system synchronously with occurrence of said checkpoint; and, after said error is detected initiating a recovery action indicated by said code.

12. A processor for use in computer system, said processor comprising:

decoding means for decoding a sequence instructions;

execution means, coupled to said decoding means, for executing said instructions out of said sequence, said execution means comprising determining means for selecting an error recovery process to be executed when an error is detected during execution of at least one of said instructions and for generating a code indicative of said error recovery process;

completion means, coupled to said execution means, for completing said instructions in said sequence and for establishing a recovery checkpoint when each of said instructions are completed;

error detection means, coupled to said execution means, for detecting said error;

a recovery control register, coupled to said execution means and said completion means, comprising:

a first register;

a second register, coupled to said first register;

selection means, coupled to said determining means, for selecting one of said first register and said second register to receive said error handling code;

transfer means, coupled to said checkpoint means, for transferring said error handling code from said first register to said second register synchronously with said occurrence of said checkpoint; and, recovery control means, coupled to said execution means and said second register, for initiating an error recovery action indicated by said code, when said error is detected during execution of said at least one of said instructions.

13. The processor of claim 12, wherein said recover control register further comprises:

modification means, coupled to said determining means, for logically operating on data in said first register.

14. The processor of claim 12 wherein each of said first and second register further comprise:

a first portion for storing status information provided by said execution means, said status information being indicative of progress of execution of an instruction at the time of said error; and, a second portion for storing said error handling code.

15. The processor of claim 12 wherein said completion means comprises means for generating an intermediate completion report and a final completion report for each of said checkpoints and wherein said transfer means transfers said data from said first register to said second register on receipt of said intermediate completion report.

16. The processor of claim 15 further comprising:

register reset means, coupled to said completion means, said first register and said second register, for resetting said first register and said second register on receipt of said final completion report.

* * * * *